(12) United States Patent
Jun

(10) Patent No.: US 9,038,494 B2
(45) Date of Patent: May 26, 2015

(54) VEHICLE-OPERATING APPARATUS

(76) Inventor: Gyo Jun, Incheon (KR)

( * ) Notice: Subject to any disclaimer, the term of this patent is extended or adjusted under 35 U.S.C. 154(b) by 10 days.

(21) Appl. No.: 14/001,884

(22) PCT Filed: Feb. 28, 2012

(86) PCT No.: PCT/KR2012/001513
§ 371 (c)(1),
(2), (4) Date: Aug. 28, 2013

(87) PCT Pub. No.: WO2012/118330
PCT Pub. Date: Sep. 7, 2012

(65) Prior Publication Data
US 2013/0327174 A1    Dec. 12, 2013

(30) Foreign Application Priority Data

Feb. 28, 2011   (KR) .................. 10-2011-0017710

(51) Int. Cl.
*B60K 26/02*    (2006.01)
*B60W 10/04*    (2006.01)
(Continued)

(52) U.S. Cl.
CPC .......... *B60K 41/20* (2013.01); *Y10T 74/20226* (2015.01); *B60K 26/02* (2013.01);
(Continued)

(58) Field of Classification Search
CPC ........ B60K 26/02; B60K 26/00; B60K 23/02; B60K 26/04; B60K 23/00; B60K 2741/003; B60K 20/02; B60K 41/002; B60W 30/18; B60W 2540/10; B60W 2540/12; B62L 3/02; G05G 11/00; H01H 13/27; H01H 13/74
USPC ............ 74/473.15, 473.16, 473.17, 473.18, 74/473.19, 473.3, 473.26, 473.27, 473.35, 74/481, 482, 483 R, 480 R, 483 PB; 280/88, 280/98; 188/9, 10, 18 R, 106 R See application file for complete search history.

(56) References Cited

U.S. PATENT DOCUMENTS 3,537,328 A * 11/1970 Allen .............................. 74/481
4,627,522 A * 12/1986 Ulrich et al. .................... 192/35
(Continued)

FOREIGN PATENT DOCUMENTS

| | | |
|---|---|---|
| JP | 09-039600 A | 2/1997 |
| JP | 2003-165350 A | 6/2003 |

(Continued)

OTHER PUBLICATIONS

International Search Report for International Application No. PCT/KR2012/001513.

*Primary Examiner* — William C Joyce
*Assistant Examiner* — Jude Agendia
(74) *Attorney, Agent, or Firm* — LRK Patent Law Firm

(57) ABSTRACT

A vehicle driving apparatus where brake and acceleration functions are combined with a single stick includes: a lever moving to an acceleration position, an idle position, or a brake position as rotating forward and rearward about a shaft fixed to a vehicle body at a predetermined angle; a hand acceleration means opening an engine throttle to cause a vehicle to be accelerated; a hand brake means pushing a booster rod of a brake booster so that a brake operates to cause the vehicle to be stopped; a guide means installed on the left and right sides of the lever to prevent the lever from being shaken leftward and rightward; a hand brake locking means allowing the hand brake to be continuously applied; and a cruise control means allowing the lever to stay in the acceleration position even if the driver takes his hand off the lever.

14 Claims, 14 Drawing Sheets

(51) Int. Cl.
*G05G 9/02* (2006.01)
*B60K 20/06* (2006.01)

(52) U.S. Cl.
CPC ............ *B60K2026/029* (2013.01); *G05G 9/02* (2013.01); *B60K 2741/003* (2013.01); *B60K 20/06* (2013.01)

(56) References Cited

U.S. PATENT DOCUMENTS

| | | | | |
|---|---|---|---|---|
| 5,022,477 | A | * | 6/1991 | Wanie ........................... 180/6.34 |
| 5,025,905 | A | * | 6/1991 | Lenz ............................. 477/209 |
| 5,197,347 | A | * | 3/1993 | Moffitt et al. .................. 74/481 |
| 5,845,536 | A | * | 12/1998 | Certeza ....................... 74/473.26 |
| 6,237,711 | B1 | * | 5/2001 | Hunt .............................. 180/336 |
| 8,096,207 | B2 | * | 1/2012 | Kazanchy ....................... 74/481 |
| 8,640,808 | B2 | * | 2/2014 | Kissick et al. ................ 180/219 |
| 2002/0112557 | A1 | * | 8/2002 | Burger ........................ 74/473.3 |
| 2002/0184961 | A1 | * | 12/2002 | Roberts ........................... 74/481 |
| 2012/0132027 | A1 | * | 5/2012 | Bruder et al. .............. 74/473.15 |

FOREIGN PATENT DOCUMENTS

| | | |
|---|---|---|
| JP | 2006-137389 A | 6/2006 |
| JP | 4680368 B2 | 2/2011 |
| KR | 10-2007-0008902 A | 1/2007 |

* cited by examiner

VEHICLE-OPERATING APPARATUS

TECHNICAL FIELD

The present invention relates to a vehicle driving apparatus in which brake and acceleration functions are coupled to a single stick, and more particularly, to a vehicle driving apparatus in which a single lever which a driver can manipulate simultaneously performs brake and accelerator functions, so that convenience of the driver can be remarkably enhanced.

BACKGROUND ART

A driving assist apparatus which enables an accelerator pedal and a brake pedal to be operated by a hand has been proposed by KR pat. Nos. 1991-0004895 and 1991-0004896, in which a manipulation handle is installed in a direction approximately perpendicular to a shaft of a steering wheel, and the manipulation handle is rotated about any one point, so that control of acceleration, speed-up, and speed-down can be performed according to a rotation direction and a rotation angle of the manipulation handle.

However, the proposed patents have problems in that the manipulation handle is mounted to a neck portion of steering shaft so that a tilt function cannot be used and thus an angle of the steering wheel cannot be properly adjusted to be suitable for a user's body structure, and connecting rods which connect the manipulation handle and the accelerator and brake pedals may be caught up with the legs or arms, or obstruct the movement of the legs or arms when an ordinary person drives a vehicle so that the person feels uncomfortable and safe driving is hindered.

Further, an apparatus in which a single pedal combines a brake and an accelerator (KR Application No. 10-2002-0011189 of Ik-Dong CHO), and a driving assist apparatus for the disabled which operates a brake and an accelerator through a single handle (KR Application No. 10-2005-0062793 of Yong-Sung Go) have been submitted and registered.

Among the apparatuses, the apparatus in which a single pedal combines the brake and the accelerator and is manipulated by a foot, is dangerous because a driver may accidentally incorrectly operate the pedal causing an accident to occur in an emergency situation, since a foot of a person is generally less accurate than the hand.

The driving assist apparatus for the disabled which operates the brake and the accelerator through the single handle is attached to a side surface of a crash pad, in which case a driver holds out his right hand to manipulate the single handle.

DETAILED DESCRIPTION OF THE INVENTION

Technical Problem

Therefore, the present invention has been made in view of the above-mentioned problems, and an aspect of the present invention is to provide a vehicle driving apparatus in which a brake and an accelerator are manipulated by using the hand instead of the foot so that convenience of a driver can be remarkably enhanced.

Another aspect of the present invention is to provide a vehicle driving apparatus which a driver can manipulate with his arm in a state where his arm feels most comfortable.

Another aspect of the present invention is to provide a vehicle driving apparatus in which, although a single lever is used, a brake and an accelerator are operated in opposite directions so that an accident is much less likely to occur due to driver error as compared with the existing vehicle.

Another aspect of the present invention is to provide a vehicle driving apparatus which can reduce the time taken to operate a brake as compared with the existing vehicle. Although a driver carries out a curvilinear motion in a manner that the driver raises his right foot from an accelerator, moves the foot leftward, and then steps on a brake pedal with the foot, when switching from a driving mode to a stop mode in the existing vehicle, the driver carries out a linear motion in a manner that the driver pushes forward a right hand grasping a lever in the present invention, which can reduce reaction time of the driver in case of an emergency situation.

Another aspect of the present invention is to provide a vehicle driving apparatus in which a brake can be locked through one button without needing to consistently push a lever with a right hand when a vehicle waits for a signal change or stops in a congested area for a long time, which makes it possible to provide convenience through a low-cost and simple mechanism.

Another aspect of the present invention is to provide a vehicle driving apparatus in which a lever can be manipulated while the existing brake and acceleration pedals are used, and a driver can freely select whether to drive the vehicle with their hand or foot.

Technical Solution

In accordance with an aspect of the present invention, there is provided a vehicle driving apparatus including: a lever that moves to an acceleration position, an idle position, or a brake position as rotating forward and rearward about a shaft fixed to a vehicle body at a predetermined angle; a hand acceleration means that opens an engine throttle to cause a vehicle to be accelerated, when the lever moves to the acceleration position; a hand brake means that pushes a booster rod of a brake booster so that a brake operates to cause the vehicle to be stopped, when the lever moves to the brake position; a guide means that is installed on the left and right sides of the lever to prevent the lever from being shaken leftward and rightward; a hand brake locking means that allows the hand brake to be continuously applied; and a cruise control means that allows the lever to stay in the acceleration position even if the driver takes his hand off the lever.

The vehicle driving apparatus may be configured such that the lever moves to the acceleration position when being pulled rearward, and moves to the brake position when being pushed forward.

The hand acceleration means may include: a throttle pulling part that is attached to a rear side of the lever; a hand acceleration cable that is connected with the throttle pulling part; the throttle cable that is connected with the hand acceleration cable and opens the throttle installed on the engine; a hand acceleration ring into which the throttle pulling part is inserted, a front portion of which the hand acceleration cable is connected to, and which moves in an interior of a hand acceleration ring housing fixed to the vehicle body; and the hand acceleration ring housing configured such that the hand acceleration ring performs a circumferential motion about a rotary shaft of the lever.

The hand brake means may include: a brake push rod that is attached to a front side of the lever; a fan-shaped saw tooth rod that is installed on a front side of the brake push rod, has a fan-shaped saw tooth formed at an upper end thereof, and rotates about a shaft fixed to the vehicle body; a transverse bar saw tooth that is engaged to rotate together with the fan-shaped saw tooth; a linear saw tooth that is engaged with an upper surface of the transverse bar saw tooth; and a hand brake pipe that is integrated with the linear saw tooth, and is connected with the booster rod of the brake booster.

The vehicle driving apparatus may further include: a brake pedal that is stepped on and manipulated by the foot of a driver; the acceleration pedal which is stepped on and manipulated by the foot of the driver; a brake independent driving means that enables the brake pedal and the lever to press the booster bar of the brake booster independently of each other; and an acceleration independent driving means that is installed such that the acceleration pedal and the lever independently open a throttle of an engine.

The brake independent driving means may include: a foot brake lever that is connected to the brake pedal, and has an insertion hole which is formed on an upper end thereof and into which a hand brake pipe is inserted; and a side branch that is integrally coupled to the booster rod, and is pushed by the brake lever according to an operation of the brake pedal to operate the brake booster.

The acceleration independent driving means may include: a pair ring that has a form in which two left and right long rings are coupled in parallel, wherein a first button to which a foot acceleration cable is connected is inserted into one ring, and a second button to which a hand acceleration cable is connected is inserted into the other ring; a pair ring housing that is fixed to the vehicle body, and into which the pair ring is inserted to carry out a linear motion forward and rearward; and a pair ring rod that is integrated with the pair ring, moves into the pair ring housing though a hole formed on a front surface of the pair ring housing to pull a throttle cable, and opens the throttle of the engine.

A cross brake override means may be further installed to prevent the engine from rotating at a high speed when the driver steps on the brake pedal to stop the vehicle while driving the vehicle with the lever left in the acceleration position.

The cross brake override means may include: a brake override cable one side of which is attached to the side branches of the booster rod; a brake override cable tube into which the brake override cable is inserted; a brake override rake rod that is connected to an opposite side of the brake override cable; and acceleration rods that are folded or unfolded according to a movement of the rake rod.

The hand brake locking means may include: a button that is installed on the front side of the handle of the lever, and repeatedly enters the handle when being pushed once and exits from the handle when being pushed once again; a button core that is installed in an interior of an outer cylinder integrated with the handle, and continuously rotates in one direction whenever entering and exiting from the handle while moving forward and rearward together with the button; a button hexagonal column that is inserted into a hexagonal cylinder integrated with the outer cylinder not to be rotated, one end of which is inserted into the button core to move forward and rearward, and which is connected to a brake locking cable; a tong means that is installed such that an interval is narrowed by pulling the brake locking cable; left and right steel saw teeth that are installed at a front side of the tong means; and left and right saw tooth plates that is fixed to the vehicle body and connected with the steel saw teeth when an interval between the steel saw teeth increases.

The guide means may include: guide plates that are installed on the left and right sides of the lever to prevent the lever from being shaken leftward and rightward when the lever moves forward and rearward; a guide structure bearing housing that is attached to the front side of the lever, and has windows formed at left and right sides thereof; guide structure bearing plates that include bearings that protrude through the left and right windows of the guide structure bearing housing to contact the guide plates, thereby minimising abrasion caused by friction; circular columns that are formed on inner sides of the left and right guide structure bearing plates, respectively; and a compression spring that is interposed between the left and right guide structure bearing plates, and is fitted with the circular columns.

The guide plates are formed such that a width between the guide plates becomes narrower when the lever moves to the acceleration position, in which the bearing plates are slightly pushed into the bearing housing, and a friction force is caused between the guide plates and the bearing surfaces while the compression spring is compressed.

The cruise control means may include: a moving guide plate that is installed adjacent to one side of the lever; a fixed wall that is fixed to the vehicle body to position the moving guide plate; a moving guide plate cylinder that is formed such that one end thereof is adjacent to the moving guide plate; a fixed wall cylinder into which the moving guide plate cylinder is inserted, and which is formed such that one end thereof is adjacent to the fixed wall; a tension spring that is installed inside both the moving guide plate cylinder and the fixed wall cylinder; a tension spring ring to which opposite end portions of the tension spring are coupled; a wedge wall that is fixed to the moving guide plate, and is formed such that a conical wedge is vertically inserted into the wedge wall; and a wedge rod that extends vertically from the wedge, wherein an external thread is formed at a lower end thereof to be coupled with an internal thread at a lower portion of the fixed wall, and a screw handle is coupled with an upper end thereof.

Advantageous Effects

In a vehicle driving apparatus having the construction according to at least one embodiment of the present invention as described above, a brake and an accelerator are manipulated by using a hand instead of a foot so that driver convenience can be remarkably enhanced. In particular, since the driver manipulates the brake and the accelerator, while taking a posture as if the driver's right hand palm orients toward the ground and the driver's arm is placed on an arm of a chair, the convenience can be greatly enhanced.

Although a single lever is used, the brake and the accelerator are operated in opposite directions so that an accident is much less likely to occur due to driver error as compared with the existing vehicles.

The time taken to operate the brake is reduced as compared with that of the existing vehicles so that reaction time of the driver can be reduced in case of an emergency.

The brake can be locked through one button without needing to consistently push the lever with the driver's right hand when the vehicle waits for a signal change or stops in a congested area for a long time, which makes it possible to provide driving convenience through a low-cost and simple mechanism.

The lever manipulated by the hand operates independently of the existing brake or acceleration pedals so that the driver can freely select whether to drive the vehicle with their hand or foot according to the situation or preference, making it possible to remarkably enhance the convenience of the driver.

MODE FOR CARRYING OUT THE INVENTION

Figure 1:
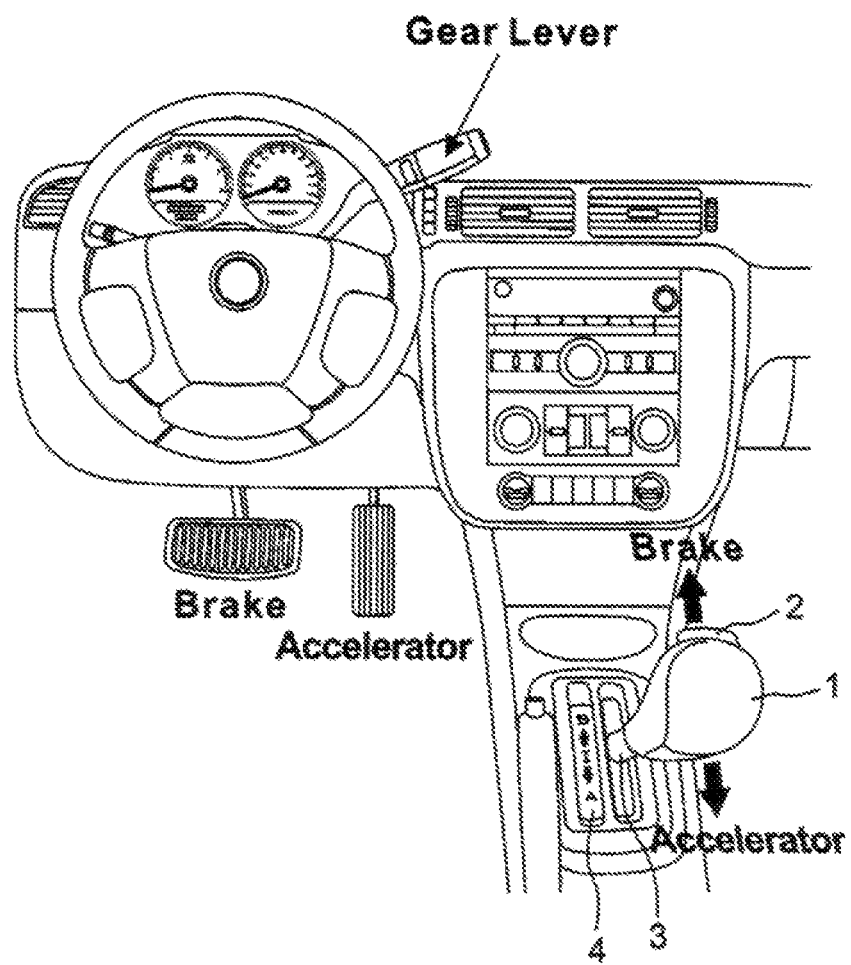
FIG. 1 is a front view illustrating an interior of a vehicle that employs a vehicle driving apparatus according to an embodiment of the present invention.

Hereinafter, an embodiment of the present invention will be described with reference to the accompanying drawings. In describing the present invention, detailed descriptions related to well-known functions or configurations will be omitted when they may make subject matters of the present invention unnecessarily obscure.

Terms to be described below are defined in view of functions thereof in the present invention.

The terms may be different according to the intentions or customs of a manager or a user, and thus should be defined based on the contents over the whole present specification which describes the present invention.

An icon that displays four directions of Front, Back, Left and Right, or Front, Back, Up and Down is illustrated in FIGS. 2 to 14. "Front" is defined as a forward direction of the vehicle, "Back" is defined as a rearward direction of the vehicle, "Left" is defined as a leftward direction of a driver, and "Right" is defined as a rightward direction of the driver. A side length of a cube is displayed on the right side of the icon in millimeters, and makes it possible to estimate a scale of components in the drawings. "Left/Right" referred to in the following description implies leftward/rightward directions with respect to the driver irrespective of left/right positions in the drawings. For example, "Right" of a driving apparatus is displayed on a left side of a drawing in which the driving apparatus is viewed from the front of the vehicle.

Figure 2:
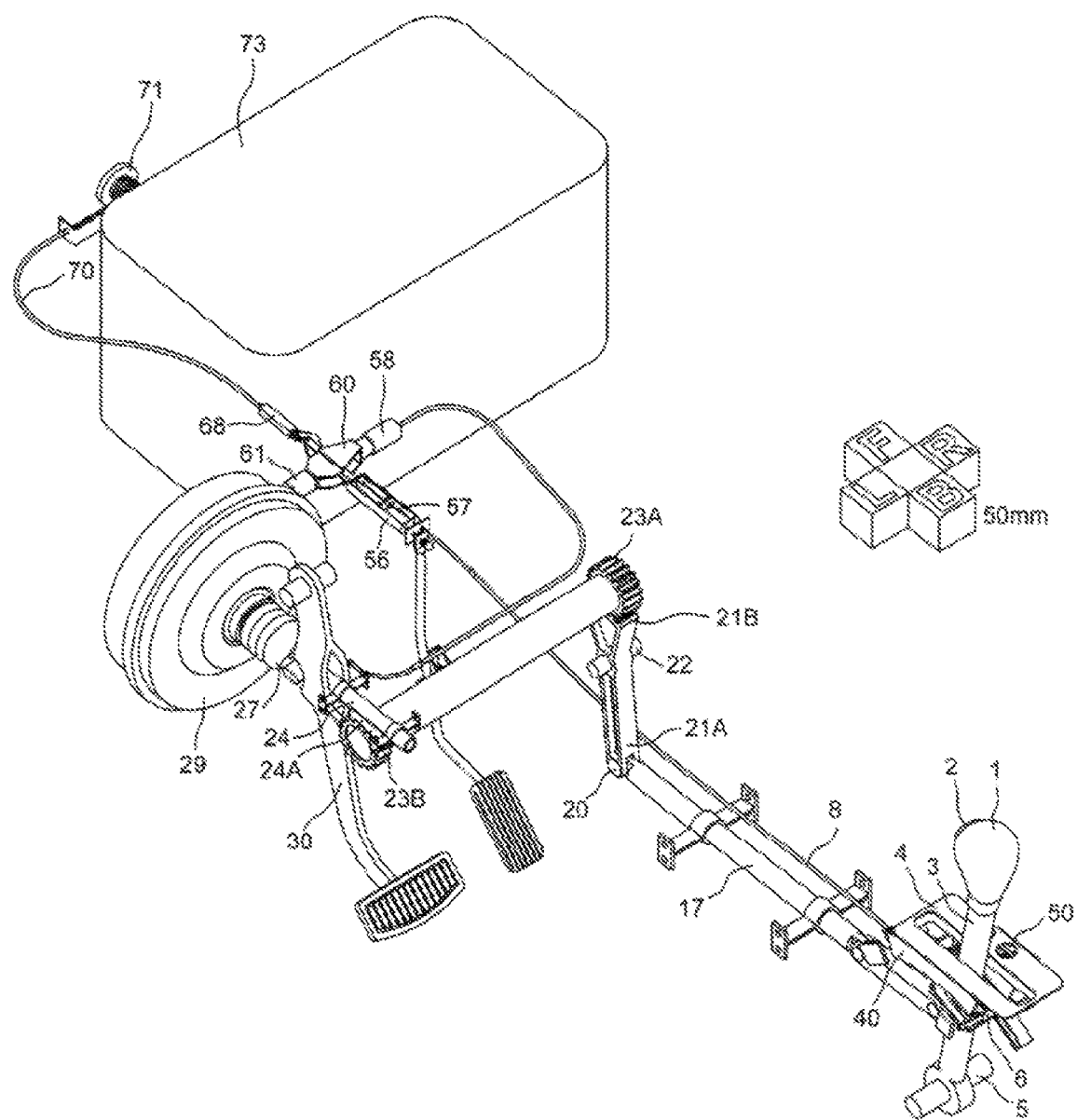
FIG. 2 is a perspective view illustrating a whole configuration of a vehicle driving apparatus according to an embodiment of the present invention.

FIG. 1 is a front view illustrating an interior of a vehicle that employs a vehicle driving apparatus according to an embodiment of the present invention, and FIG. 2 is a perspective view illustrating a whole configuration of a vehicle driving apparatus according to an embodiment of the present invention.

Brake and acceleration functions are combined with a single stick in the vehicle driving apparatus, and the single stick will be described while being referred to as a combination stick (hereinafter, a combo stick) in the present invention.

Referring to FIG. 1, the combo stick of the present invention is installed in the position of the automatic transmission lever of an existing automatic vehicle. The automatic transmission lever then should be installed in another position, in which case the automatic transmission lever may be installed on the steering column behind the steering wheel. A vehicle in which the automatic transmission lever is installed on the steering column is what is called a column shift vehicle, and such a method as described above is employed for a small number of vehicles including Hyundai Trajet or Chevrolet Avalanche among the existing automatic vehicles.

In the vehicle employing the combo stick of the present invention, the combo stick is installed on the driver's right hand side that is empty in the case of the column shift vehicle, thereby enhancing the convenience of driving.

The combo stick includes a handle 1 and a lever 3, and a button 2 that can lock the lever 3 at a brake position when the lever 3 is pushed forward is installed in the handle 1. A lever cover 4 through which an opening necessary for forward and rearward movements of the lever 3 is formed is substantially identical with an automatic transmission lever cover in existing automatic vehicles, and is located on an interface between the inside and the outside of the vehicle. Meanwhile, characters on the left side of the lever 3 is changed from "RPND2L" such as in existing automatic vehicles to "B←I→A" in the vehicle including the combo stick therein, in which "B" implies a brake position, "I" implies an idle position, and "A" implies an acceleration position.

In the vehicle driving apparatus of the present invention, the brake is applied when the combo stick is pushed forward, and the accelerator operates so that the vehicle travels when the combo stick is pulled rearward. A driver need not use his right leg for the sake of driving the vehicle, and a right hand is substituted for the right leg, which makes it possible to greatly reduce driver fatigue. However, existing brake and acceleration pedals remain as they are such that the driver may continuously drive the vehicle even in a situation that the driver cannot manipulate the combo stick with his right hand.

In regard to an operation direction of the combo stick, although it seems natural at first that an accelerator operates when the combo stick is pushed forward and a brake is applied when the combo stick is pulled rearward, this has a functional problem. The reason of that is because it is not easy for a driver to pull the combo stick rearward when leaning forward during braking. On the other hand, it is more sensible to design the combo stick such that a brake is applied when the combo stick is pushed forward, since a driver can apply a force, which allows his body to lean forward, to his right hand to push the combo stick. Accordingly, as illustrated in FIG. 1, the brake is applied when the combo stick is pushed forward, and the accelerator operates when the combo stick is pulled rearward.

The vehicle employing such a combo stick includes two brakes and two accelerators. The existing brake is referred to as a foot brake, the brake of the combo stick is referred to as a hand brake, the existing accelerator is referred to as a foot accelerator, and the accelerator of the combo stick is referred to as a hand accelerator.

The vehicle driving apparatus of the present invention includes the lever 3 which moves to an acceleration position, a neutral position or a brake position while rotating forward and rearward at a predetermined angle about a shaft that is fixed to the vehicle body, a hand acceleration means that opens the throttle of the engine to allow the vehicle to be accelerated when the lever 3 moves to the acceleration position, a hand brake means that pushes a booster rod of a brake booster 29 such that the brake operates to stop the vehicle, when the lever 3 moves to the brake position, guide means that are installed on the left and right sides of the lever to prevent the lever from being shaken leftward and rightward, a hand brake locking means that allows the hand brake to be kept applied, and a cruise control means that allows the lever to stay at the acceleration position although a driver takes his hand off the lever when the lever is in the acceleration position.

FIG. 2 illustrates the driving apparatus in a state where the foot brake and the foot accelerator are not stepped on, and the combo stick is in an idle position.

The lever 3 rotates about a shaft 5 that is fixed to the vehicle body, and a throttle pulling part 6 that is attached to a rear side of the lever 3 pulls the hand acceleration cable 10, when the handle 1 of the combo stick is pulled rearward causing the throttle 71 that is installed in the engine 73 to open since the hand acceleration cable 10 and a throttle cable 70 are connected with each other, thus accelerating the vehicle.

When the combo stick is pushed forward, the hand brake push rod 17 that is attached to the front side of the lever 3 pushes the fan-shaped saw tooth pin 20, the fan-shaped saw tooth rod 21A moves forward while rotating about the shaft 22 that is fixed to the vehicle body, and the fan-shaped saw tooth 21B moves rearward. The transverse bar saw tooth 23A that is engaged with the fan-shaped saw tooth 21B pushes forward the linear saw tooth 24A that is engaged with an upper surface of the left transverse bar saw tooth 23B, while an upper surface of the transverse bar saw tooth 23A rotates forward. The hand brake pipe 24 that is integrated with the linear saw tooth 24A pushes the booster rod 27 of the brake booster 29, and then the brake is applied so that the vehicle is stopped. A portion of a foot brake lever 30, through which the hand brake pipe 24 passes, forks to left and right sides, so the foot brake may operate the brake booster independently of the hand brake.

Guide plates 40 are installed on the left and right sides of the lever 3 to prevent the lever from being shaken leftward and rightward. The rear side of the guide plates 40, that is, a location where the accelerator operates is formed to be slightly narrow in order to firmly grasp the lever, so that the throttle is kept open even if a driver takes his hand off the combo stick, whereby the vehicle travels at a predetermined speed without continuous manipulation of the driver. The screw handle 50 which can adjust an interval between the left and right guide plates is installed on the lever cover 4 such that the intensity of a force for grasping the lever at the left and right sides may be adjusted.

The acceleration pair ring 57 is installed such that the foot accelerator and the hand accelerator may pull the throttle cable 70 independently of each other, and moves forward and rearward in the interior of the pair ring housing 56.

When the driver steps on the foot brake with his right foot to stop the vehicle while driving the vehicle in a state where the lever 3 of the combo stick is in an acceleration position, the engine rotates at a terrific speed since the throttle has been opened by the hand accelerator, but loads applied to the engine are reduced. A cross brake override system (58 to 68) is installed to prevent this. Even if the combo stick is in the acceleration position, the cross brake override system operates to return the throttle to the idle position when the brake is stepped on. On the other hand, even when the driver pushes the hand brake to stop the vehicle while driving the vehicle by stepping on the foot accelerator, the cross brake override system identically operates.

Figure 3:
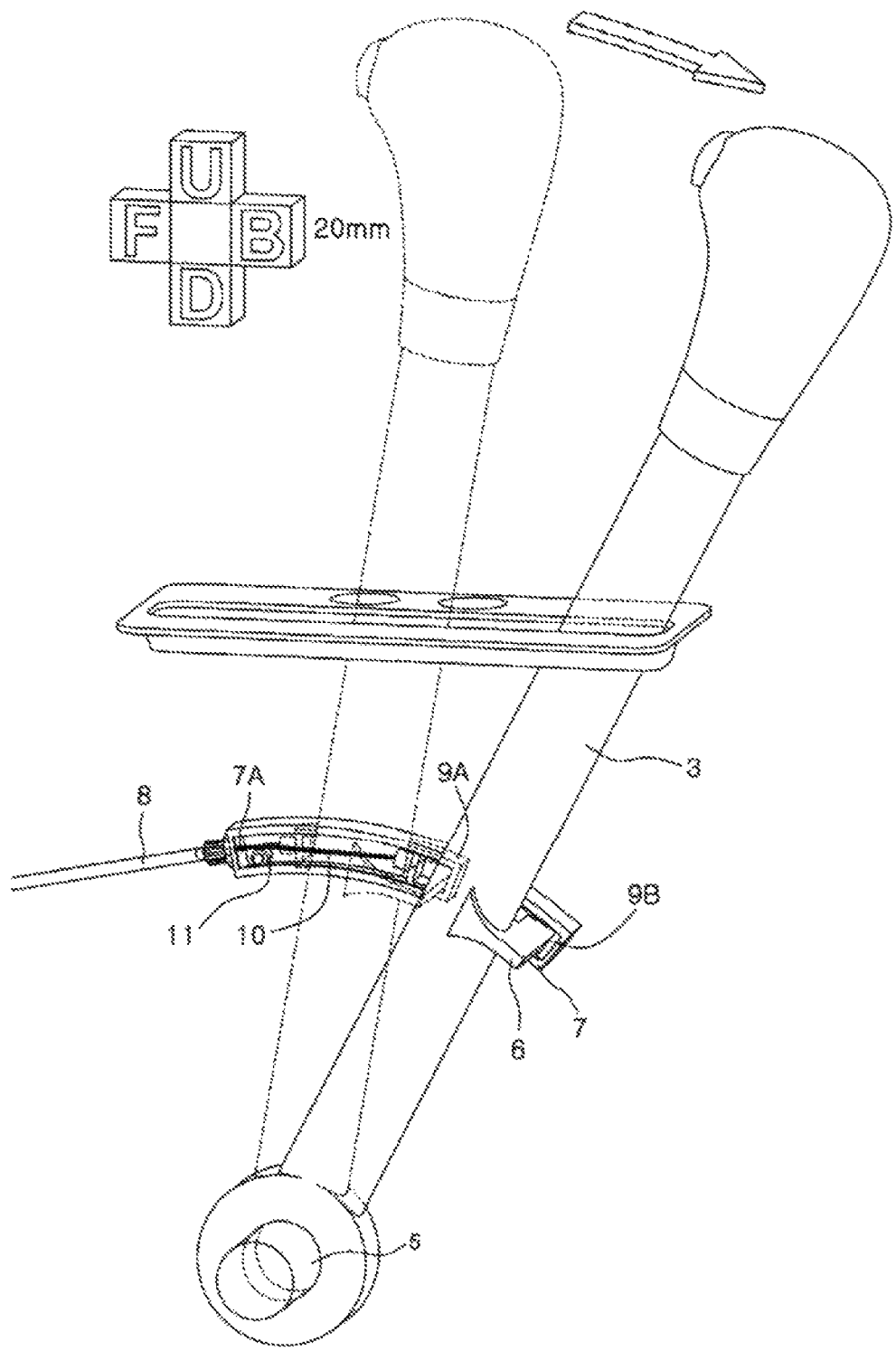
FIGS. 3 and 4 are perspective views illustrating a hand acceleration means of a vehicle driving apparatus according to an embodiment of the present invention.
Figure 4:
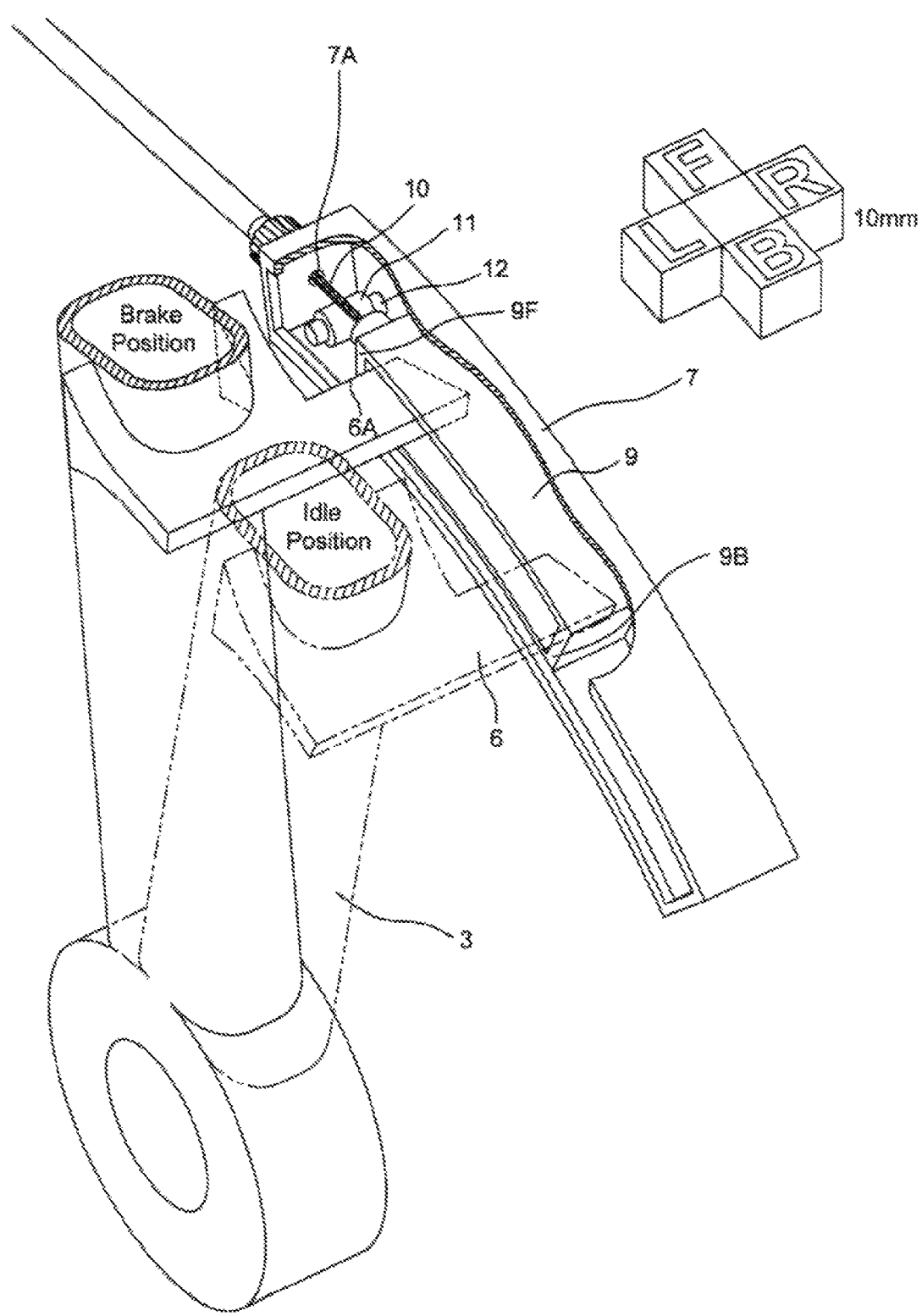

FIGS. 3 and 4 are perspective views illustrating a hand acceleration means of a vehicle driving apparatus according to an embodiment of the present invention. In FIG. 3, other components in addition to components related to an acceleration function of a combo stick are omitted such that a component to describe is not hidden by components performing other functions.

FIG. 3 illustrates a combo stick that is maximally pulled rearward from an idle position to move to a maximum acceleration position.

The hand acceleration means includes the throttle pulling part 6 that is attached to a rear side of the lever 3; the hand acceleration cable 10 that is connected with the throttle pulling part 6; the throttle cable 70 that is connected with the hand acceleration cable 10 and opens the throttle installed in the engine; a hand acceleration ring 9 into which the throttle pulling part 6 is inserted, a front portion of which the hand acceleration cable 10 is connected to, and which moves in an interior of a hand acceleration ring housing 7 fixed to the vehicle body; and the hand acceleration ring housing 7 configured such that the hand acceleration ring 9 performs a circumferential motion about the rotary shaft 5 of the lever 3.

The throttle pulling part 6 attached to the rear side of the lever 3 pulls the hand acceleration ring 9A rearward in an idle position illustrated by a dotted line to move the hand acceleration ring 9A to a position of the hand acceleration ring 9B illustrated in a solid line. At this time, the hand acceleration cable 10 attached to the front side of the hand acceleration ring 9 comes out of the hand acceleration cable tube 8 so that the throttle of the engine is opened and a vehicle is accelerated. The hand acceleration ring 9 performs the circumferential motion about the rotary shaft 5 of the combo stick in the interior of the hand acceleration ring housing 7 fixed to the vehicle body. Accordingly, the hand acceleration cable 10 is deflected downward and causes friction with a wall surface of a cable hole 7A formed at the front side of the hand acceleration ring housing 7, as the hand acceleration ring 9 moves rearward. A hand acceleration roller 11 is installed to prevent this.

The hand acceleration ring 9 has an approximately long rectangular parallelepiped shape, and is slightly curved for the circumferential motion. The throttle pulling part 6 is inserted into a hollow internal space of the hand acceleration ring 9. Since the rear surface of the throttle pulling part 6 is close to the rear wall 9B of the hand acceleration ring 9 when the combo stick lever 3 is in an idle position, the vehicle can be accelerated if the lever 3 is pulled slightly rearward. Meanwhile, since the throttle pulling part 6 just goes through the interior of the hand acceleration ring 9, and exerts no influence on a position of the hand acceleration ring 9 when the lever 3 is pushed forward from the idle position so that a hand brake is operated, a brake function and an accelerator function may be performed independently of each other through the single lever 3. A length of the hand acceleration ring 9 is determined such that a front surface 6A of the throttle pulling part 6 does not contact the front wall 9F of the hand acceleration ring when the lever 3 is maximally pushed forward so that the brake is completely applied. The hand acceleration roller 11 illustrated in FIG. 3 rotates about a hand acceleration roller pin 12 fixed to a right wall surface of the hand acceleration ring housing 7 to prevent the cable hole 7A from being mutually worn down due to the friction with the hand acceleration cable 10.

Meanwhile, the hand brake means of the present invention includes brake push rods 13, 15 and 17 that are attached to the front side of the lever 3; the fan-shaped saw tooth rod 21A which is installed on the front side of the brake push rods 13, 15 and 17, and includes the fan-shaped saw tooth 21B formed on the upper end thereof, and rotates about a shaft fixed to the vehicle body; a transverse bar saw tooth 23 that rotates while being engaged with the fan-shaped saw tooth; the linear saw tooth 24A which is engaged with the upper surface of the transverse bar saw tooth; and the hand brake pipe 24 which is connected with the booster rod of the brake booster 29 while being integrated with the linear saw tooth 24A.

A series of components are required in order to transfer the force of the combo stick being pushed forward to the brake booster which is far away from the combo stick. The hand brake push rod has a structure in which the brake push rods 13, 15 and 17 are connected with each other by two joints 14 and 16. A push rod attaching part 13 is fixed to the combo stick lever 3, and the first push rod joint 14 performs a circumferential motion about the rotary shaft 5 of the combo stick. A tail of the short hand brake push rod 15 moves upward and downward with respect to the second push rod joint 16 when the lever 3 moves forward and rearward. Since the long hand brake push rod 17 bears a force applied at an angle slightly inclined upward and downward from a center line passing through the center thereof, abrasions may occur due to friction between the long hand brake push rod 17 and an inner wall of a rear push rod ring 18 among two push rod rings 18 and 19 fixed to the vehicle body. A bearing structure is provided on the inner wall of the rear push rod ring 18 to prevent this (not illustrated).

Figure 5A:
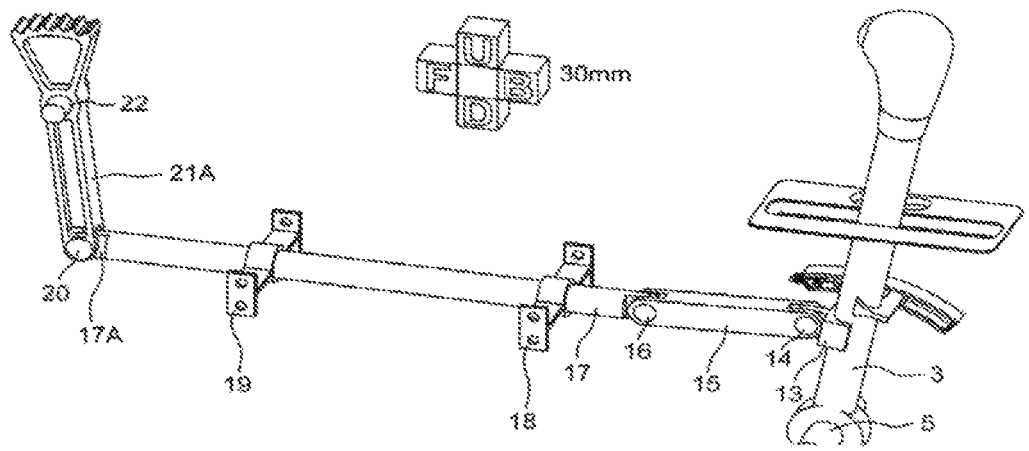
FIGS. 5A to 5C are perspective views illustrating a hand brake means according to an embodiment of the present invention.
Figure 5B:
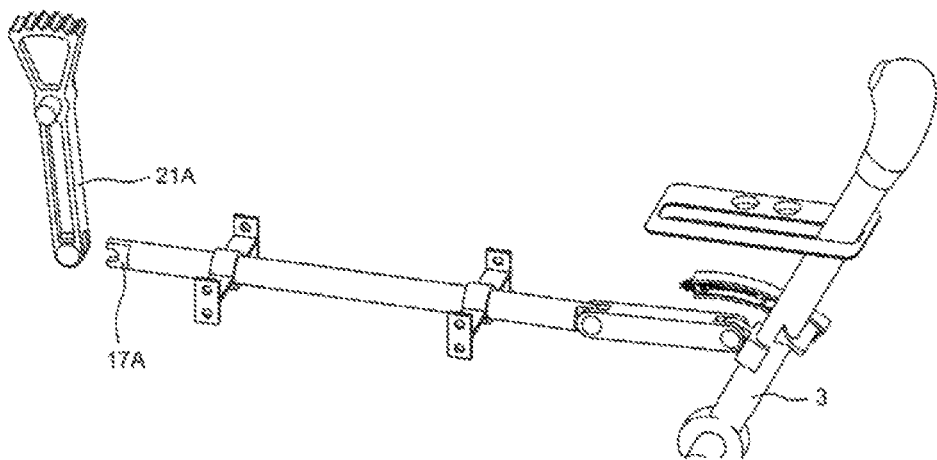
Figure 5C:
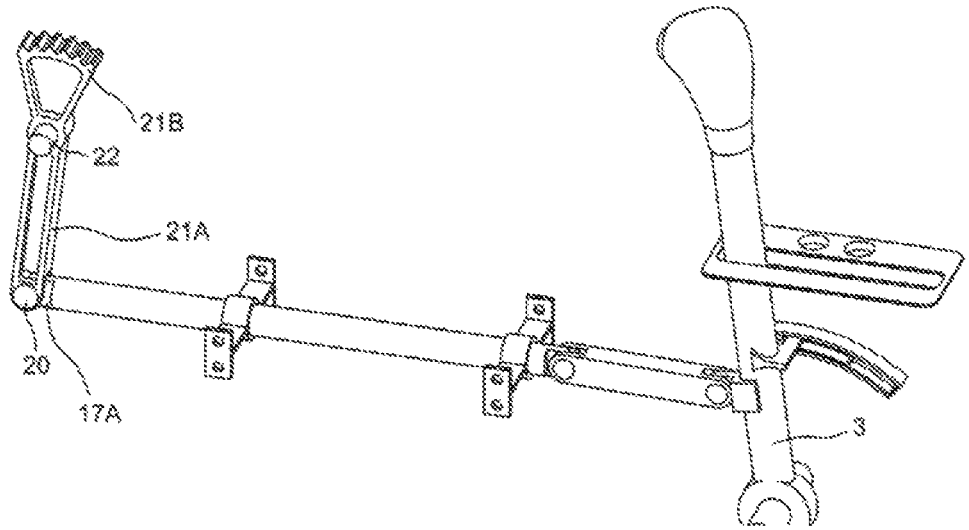

The front end 17A of the long hand brake push rod barely contacts the fan-shaped saw tooth pin 20 when the combo stick is in the idle position (FIG. 5A), and comes out of a recess of the fan-shaped saw tooth rod 21A to exert no influence on the brake booster when the lever 3 is pulled to the acceleration position (FIG. 5B). The hand accelerator function and the hand brake function of the combo stick can operate independently of each other due to structural separation.

When the lever 3 is pushed from the idle position to the brake position (FIG. 5C), the front end 17A of the long hand brake push rod pushes the fan-shaped saw tooth pin 20 forward, the fan-shaped saw tooth rod 21A moves forward while rotating about the shaft 22 fixed to the vehicle body, and the fan-shaped saw tooth 21B moves rearward.

The vehicle driving apparatus of the present invention includes a brake pedal that is stepped on by a driver's foot to be manipulated, and an acceleration pedal that is stepped on by the driver's foot to be manipulated. The vehicle driving apparatus further includes a brake independent driving means that allows the brake pedal and the lever 3 to independently manipulate the booster rod of the brake booster, and an acceleration independent driving means that is installed such that the acceleration pedal and the lever 3 independently open the throttle of the engine.

The brake independent driving means includes the foot brake lever 30 which is connected to the brake pedal and has an insertion hole which is formed at an upper end portion thereof and into which the hand brake pipe 24 is inserted, and booster rod side branches 27A that are integrally formed with the booster rod 27, and are pushed by the foot brake lever 30 according to an operation of the brake pedal to operate the brake booster 29.

Figure 6A:
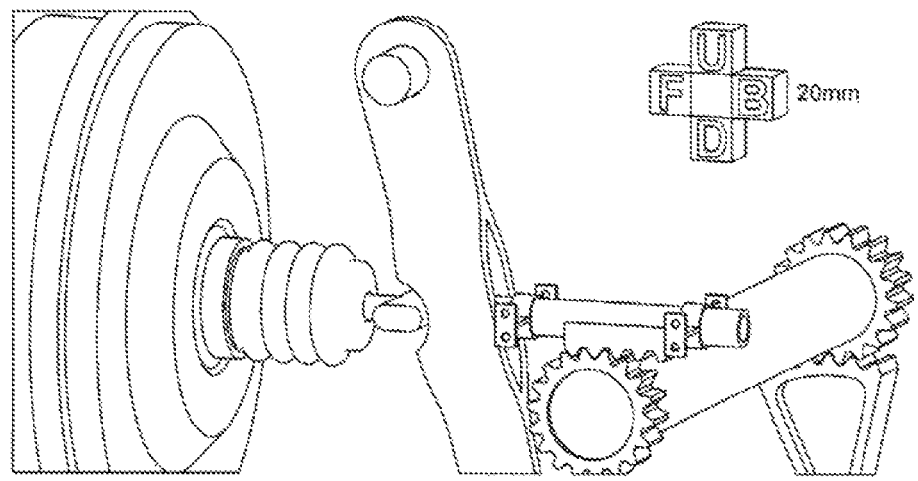
FIGS. 6A to 6C are perspective views illustrating an operation of a hand brake means and a foot brake.
Figure 6B:
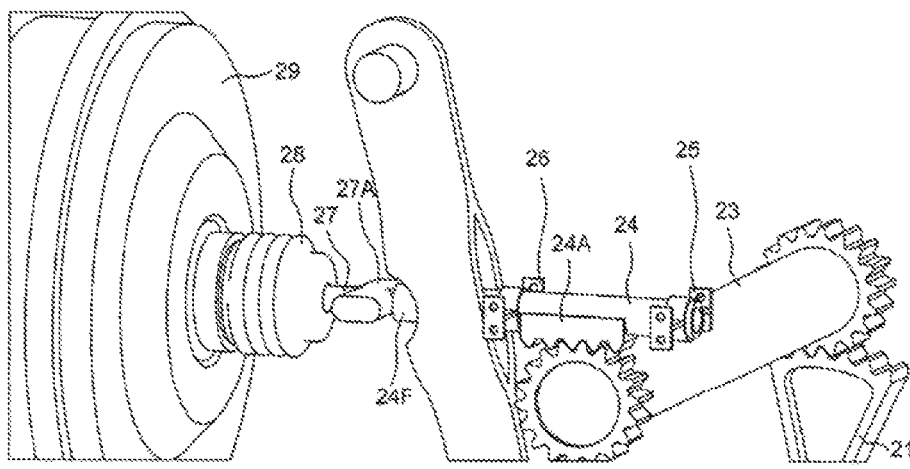

FIG. 6A illustrates that the foot brake is not stepped on and the hand brake is not pushed, and FIG. 6B illustrates that the foot brake is not stepped on and the hand brake is pushed. The fan-shaped saw tooth 21 rotates the transverse bar saw tooth 23 in a counterclockwise direction while moving rearward, and the hand brake pipe 24 moves forward together with the linear saw tooth 24A integrated therewith, when the hand brake is pushed. At this time, a front end 24F of the hand brake pipe 24 pushes the left and right booster rod side branches 27A of the booster rod 27 so that the brake booster 29 is operated. The hand brake pipe 24 moves only forward and rearward, without being shaken upward, downward, leftward and rightward due to two rings 25 and 26 fixed to the vehicle body.

Figure 6C:
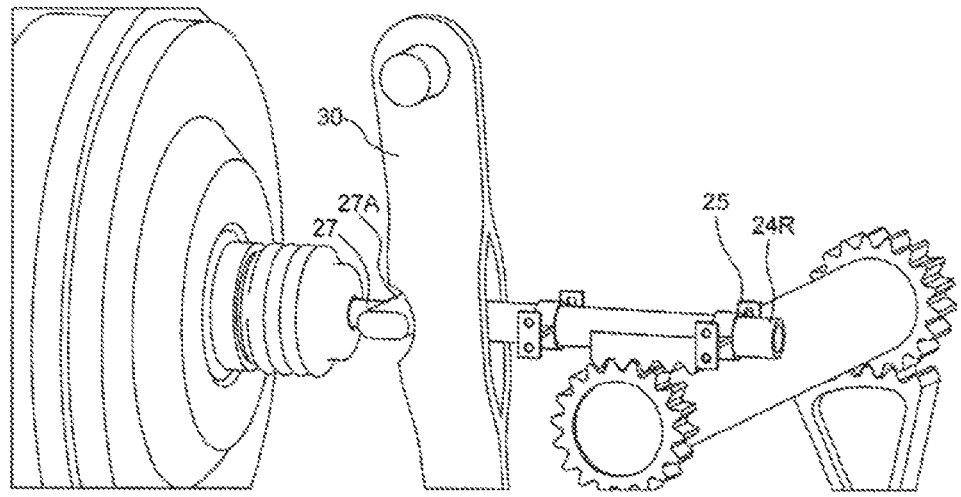

FIG. 6C illustrates that the hand brake is not pushed, and the foot brake is stepped on. Since the hand brake is not pushed, a tail 24R of the hand brake pipe is kept in a state where the tail comes out of the rear side of the ring 25, likewise in FIG. 6A, but since the foot brake lever 30 pushes the left and right booster rod side branches 27A so that the booster rod 27 moves forward, the booster rod 27 comes out of the hand brake pipe 24 by a moving distance. A portion, hidden by the foot brake lever 30 and not illustrated, is illustrated in a dotted line.

The hand brake pipe 24 and the foot brake lever 30 may independently operate the brake booster 29 since they do not contact each other. The foot brake lever 30 forking to the left and right sides, and the booster rod side branches 27A are provided in order to realize the independence.

In the present invention, a driver should continuously apply a forward pushing force to the hand brake with a right arm while waiting for a signal change, so a hand brake locking means that locks the combo stick lever 3 to a brake position is provided in order to save the driver trouble.

Figure 7A:
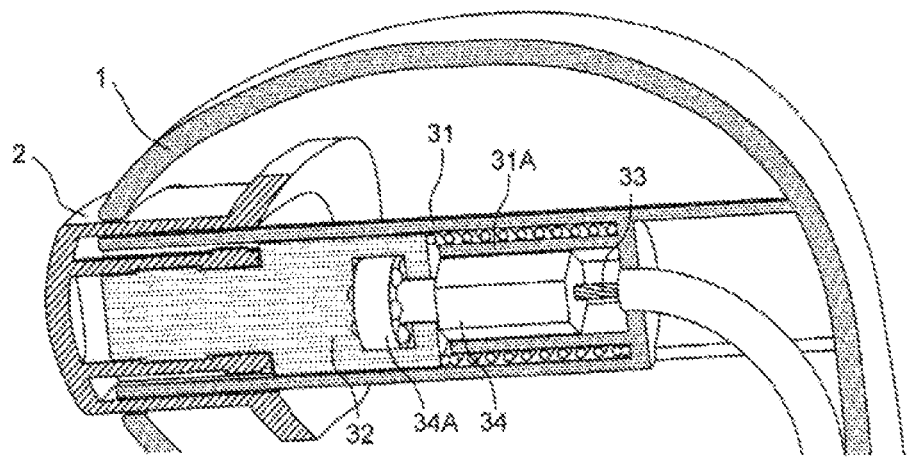
FIGS. 7A and 7B are partially sectioned views illustrating a hand brake locking means according to an embodiment of the present invention.
Figure 7B:
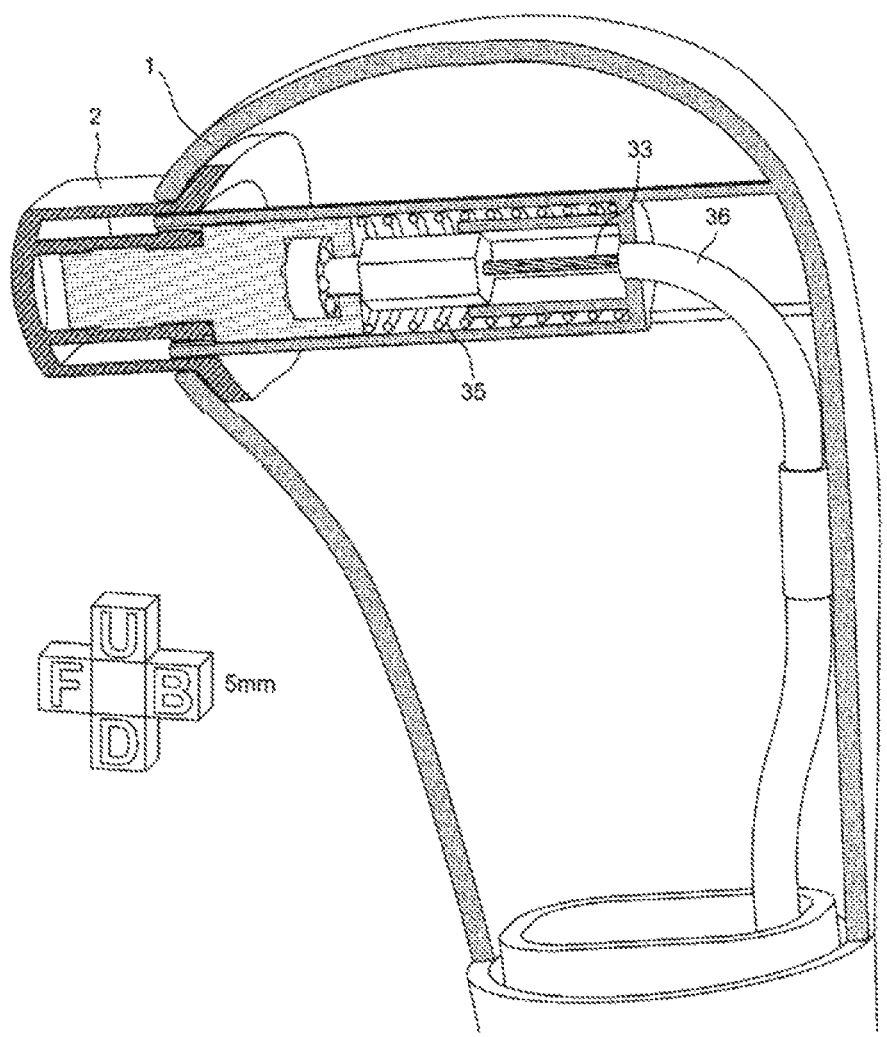
Figure 8:
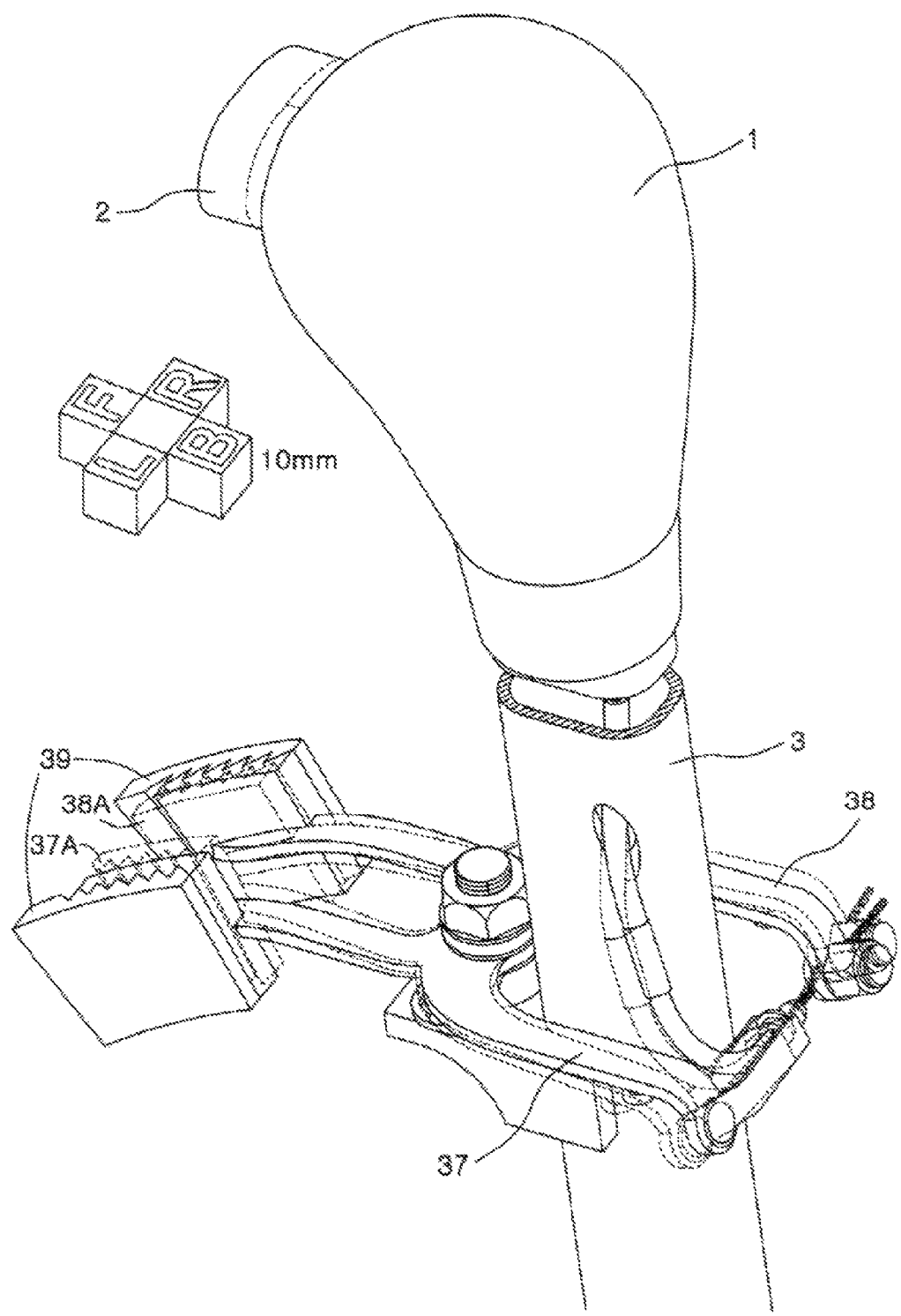
FIG. 8 is a perspective view illustrating a hand brake locking means according to an embodiment of the present invention.
Figure 9:
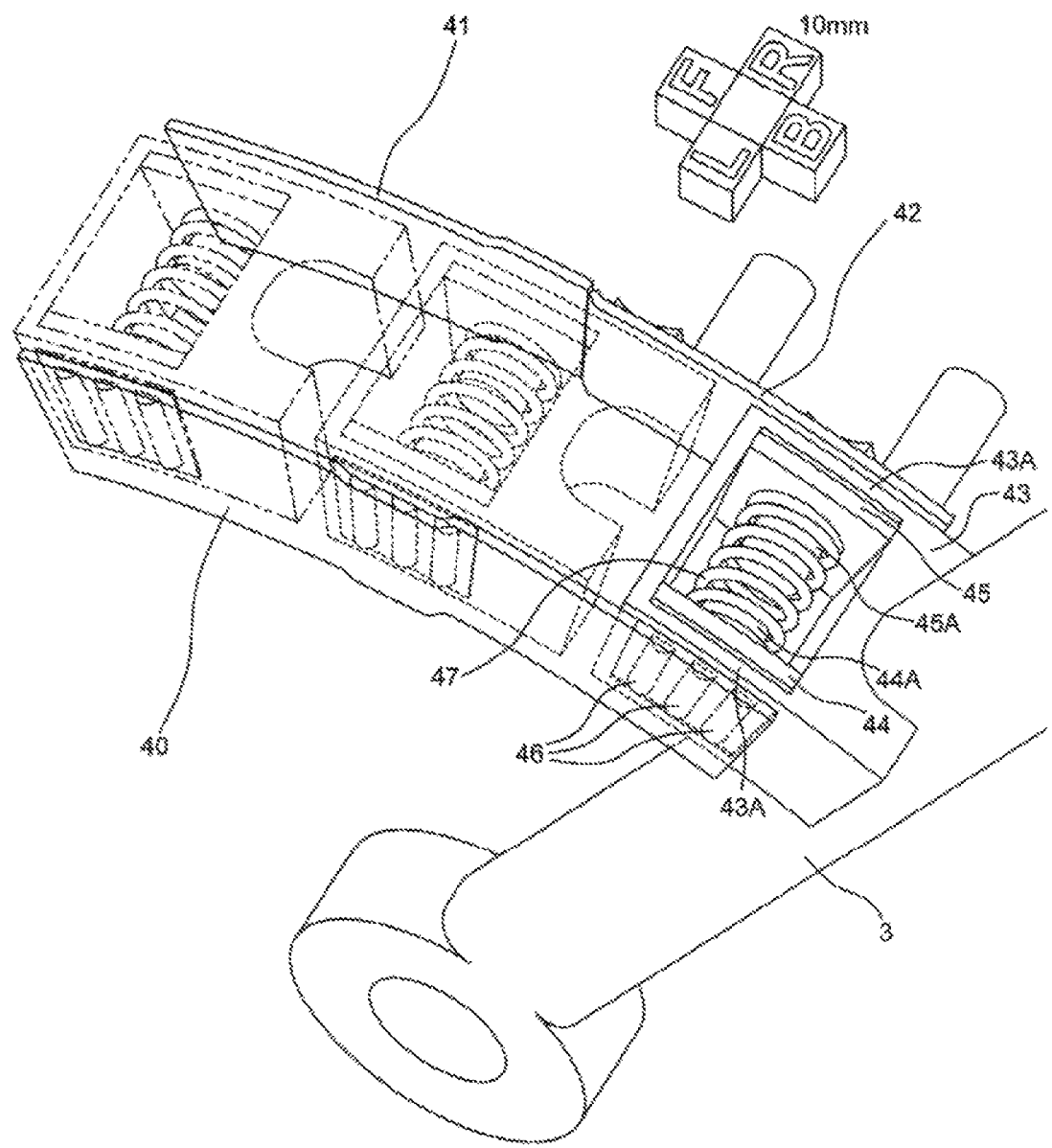
FIG. 9 is a perspective view illustrating a guide means according to an embodiment of the present invention.

As illustrated in FIGS. 7 and 8, the hand brake locking means includes the button 2 which is installed on the front side of the handle, and enters the handle when being pushed once and exits from the handle when being pushed once again; a button core 32 that is installed in the interior of an outer cylinder 31 integrated with the handle 1, and continuously rotates in one direction whenever entering and exiting from the handle 1 while moving forward and rearward together with the button 2; a button hexagonal column 34 that is inserted into a hexagonal cylinder 31A integrated with the outer cylinder 31 not to be rotated, one end of which is inserted into the button core to move forward and rearward, and which is connected to a brake locking cable 33; a tong means that is installed such that an interval is narrowed by pulling the brake locking cable 33; left and right steel saw teeth 37A and 37B that are installed on the front side of the tong means; and left and right saw tooth plates 39 that are fixed to the vehicle body and connected with the steel saw teeth when an interval between the steel saw teeth increases.

The hand brake locking means is provided by the button 2 installed on the front side of the combo stick handle 1. The button has a push button structure (popularly known as a snap fastener), in which the button enters the handle when being pushed once and exits from the handle when being pushed once again. The stationary outer cylinder 31 of the push button structure is integrated with the combo stick handle 1, and the button core 32 moving forward and rearward together with the button 2 continuously rotates in one direction whenever entering and exiting from the outer cylinder. However, the brake locking cable 33 is not directly connected to the button core 32 but to the button hexagonal column 34, since the brake locking cable 33 should not be rotated. Although moving forward and rearward together with the button core 32, the button hexagonal column 34 is inserted into the hexagonal cylinder 31A integrated with the outer cylinder 31 of the push button, and thus cannot rotate. A button hexagonal column bearing 34A is used for reducing friction between the button hexagonal column 34 and the button core 32, while the button hexagonal column 34 which does not rotate is extracted from and entered again into the hexagonal cylinder 31A by the rotating button core 32. FIG. 7B illustrates the button 2 projecting from the handle 1, in which a compression spring 35 is stretched in order to restore an original length thereof, and the cable 33 comes out of the cable tube 36 by a predetermined length.

As illustrated in FIG. 8, an interval between tails of left and right brake locking tongs 37 and 38 is narrowed by a structure substantially identical with that of a bicycle brake and similar to that of a clothespin, when the button projects and pulls the cable. At this time, front sides of the tongs, that is, the left and right steel saw teeth 37A and 37B which are installed at a position corresponding to a position where a rubber pad of the bicycle brake is attached are engaged with the left and right saw tooth plates 39 fixed to the vehicle body as an interval thereof is increased, likewise the clothespin in which front portions thereof become wider when a handle is pressed.

Thereafter, a driver presses the button 2 once again such that the button 2 is in an entering position, when driving the vehicle again. Then, the brake locking cable 33 moves downward in an interior of the combo stick lever 3 so that the interval between the tails of the left and right brake locking tongs 37 and 38 is increased and the saw teeth 37A and 38A are unlocked from the saw tooth plates 39, thereby making it possible to move the lever 3 rearward.

In the present invention, a guide means is provided in order to prevent the combo stick lever from being shaken leftward and rightward when the combo stick lever moves forward and rearward. The guide means includes guide plates 40, 41 and 42 that are installed on the left and right sides of the lever 3 to prevent the lever 3 from being shaken leftward and rightward when the lever 3 moves forward and rearward; a guide structure bearing housing 43 that is attached to a front side of the lever, and has windows formed on the left and right sides thereof; guide structure bearing plates 44 and 45 that include bearings 46 that protrude through the left and right windows of the guide structure bearing housing 43 to contact the guide plates, thereby minimizing abrasions caused by friction; circular columns 44A and 45A that are formed on inner sides of the left and right guide structure bearing plates, respectively; and a compression spring 47 that is interposed between the left and right guide structure bearing plates, and is fitted with the circular columns.

The guide plates 40, 41 and 42 are installed on the left and right sides of the lever 3, and do not directly contact the lever 3. The bearings 46 of the guide structure bearing plates 44 and 45, which protrude from the left and right windows of the guide structure bearing housing 43 attached to the front side of the lever 3 contact the guide plates so that abrasion caused by friction can be minimized. The compression spring 47 is interposed between the left and right guide structure bearing plates 44 and 45, and the circular columns 44A and 45A are integrated with the guide structure bearing plates 44 and 45 in order to prevent the spring 47 from braking away forward, rearward, upward, downward. Since the compression spring 47 pushes outward on the left and right guide structure bearing plates 44 and 45, the bearing plates are attached to left and right lattices 43A of the guide structure bearing housing 43 as long as an external force is not applied, whereby a maximum width between the left and right bearings is determined.

The left guide plate 40 and the right guide plate 41 have a roundly curved eyebrow shape when viewed from a side such that the left and right guide plates fit the position of the guide structure bearing housing 43 performing a circumferential motion. Since an interval between the left and right guide plates 40 and 41 is identical with a maximum width between the left and right bearings when the guide structure bearing housing 43 is in a brake position (a structure illustrated in a broken line in FIG. 9), the left and right guide plates 40 and 41 just prevent the lever 3 from being shaken leftward and rightward, and apply no friction force to the forward and rearward movements of the lever 3. Since the interval between the left and right guide plates 40 and 41 becomes slightly wider so that a driver, as if the lever 3 is loose when the lever 3 is in an idle position (a structure illustrated in a dotted line in FIG. 9), may identify the idle position only by feeling the lever 3 without having to look down. However, when the lever 3 is in an acceleration position, an interval between the left guide plate 40 and the moving guide plate 42 becomes slightly narrower than the maximum width between the left and right bearings so that the left and right guide structure bearing plates 44 and 45 is slightly pushed into an interior of the guide structure bearing housing 43, and the compression spring 47 is compressed. At this time, friction is caused between the guide plates 40 and 42 and surfaces of the bearings 46 by an outward pushing force applied to the compression spring 47.

When the lever 3 is pulled to an acceleration position so that the throttle of the engine is opened, the throttle cable is pulled forward by a torsion spring of the throttle, and the hand acceleration ring 9 which is connected to the rearmost side of the throttle cable is also pulled forward and pulls forward the throttle pulling part 6, whereby the lever 3 to which the throttle pulling part is attached bears a forward pulling force. Accordingly, the lever 3 moves to the idle position on its own as soon as a driver takes his hand off the lever 3. However, when the sufficiently strong compression spring 47 is installed such that the friction force between the guide plates 40 and 42 and the surfaces of the bearings 46 is larger than a force of the throttle torsion spring, the lever 3 stays in a position where a driver has set, even if the driver takes his hand off the lever 3. This helps an existing cruise control function be realized, since the throttle is constantly opened even if the driver takes his right hand off the lever, so that the vehicle travels at a constant speed.

However, the guide plates and the bearing structure which provide enough friction at first may be loose due to abrasion when the vehicle is used for a long period of time, so a rear portion of the right guide plate, that is, a portion at which the bearing and the guide plate contact each other when the lever is in the acceleration position is formed with a movable structure. The moving guide plate 42 is structurally separated from a front portion 41 fixed to the vehicle body to move leftward and rightward, and a driver may arbitrarily adjust a position of the moving guide plate 42 through an apparatus illustrated in FIG. 10.

Figure 10:
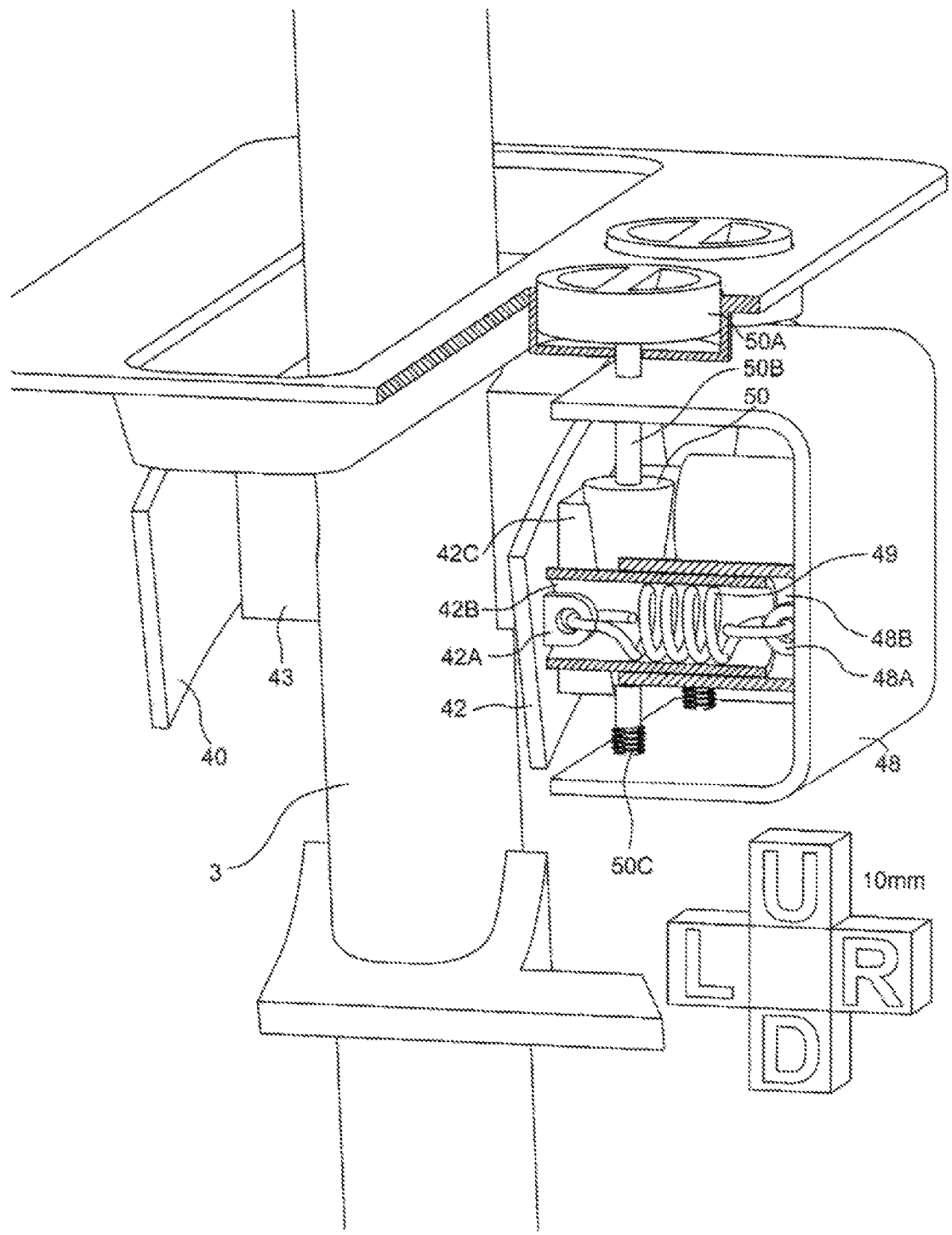
FIG. 10 is a perspective view illustrating a cruise control means according to an embodiment of the present invention.

As illustrated in FIG. 10, three sorts of structures, namely, a tension spring ring 42A, a cylinder 42B, and a wedge wall 42C are integrated with the moving guide plate 42, on the right side surface of the moving guide plate 42. A fixed wall 48 fixed to the vehicle body is installed to position the moving guide plate 42, and a tension spring ring 48A and a fixed wall cylinder 48B are integrated with the fixed wall 48, on a left side surface of the fixed wall 48. Since the moving guide plate cylinder 42B is inserted into the fixed wall cylinder 48B, the moving guide plate cylinder 42B may move only leftward and rightward, and may not move forward, rearward, upward and downward, thereby securing position stability of the moving guide plate 42. A tension spring 49 is inserted into the two cylinders to pull the moving guide plate 42 toward the fixed wall 48. However, the reason why the moving guide plate cylinder 42 cannot enter the fixed wall cylinder 48 B to the end is because a moving guide plate adjusting wedge 50 blocks the wedge wall 42C. The moving guide plate adjusting wedge 50 is integrated with the screw handle 50A and a wedge rod 50B, and a lower end portion 50C of the moving guide plate adjusting wedge 50 at which an external thread is formed passes through an internal thread at a lower portion of the fixed wall. A set of the wedge structures is installed on the front side and rear side of the moving guide plate 42.

The wedge handle 50A has only to be rotated in a clockwise direction when the combo stick lever 3 is not fixed to the acceleration position and is loose due to abrasion after a vehicle is used for a long period of time. Then, the moving guide plate adjusting wedge 50 pushes leftward the wedge wall 42C while moving downward so that an interval between the moving guide plate 42 and the left guide plate 40 becomes narrow, which can restore looseness caused by the abrasion.

Figure 11:
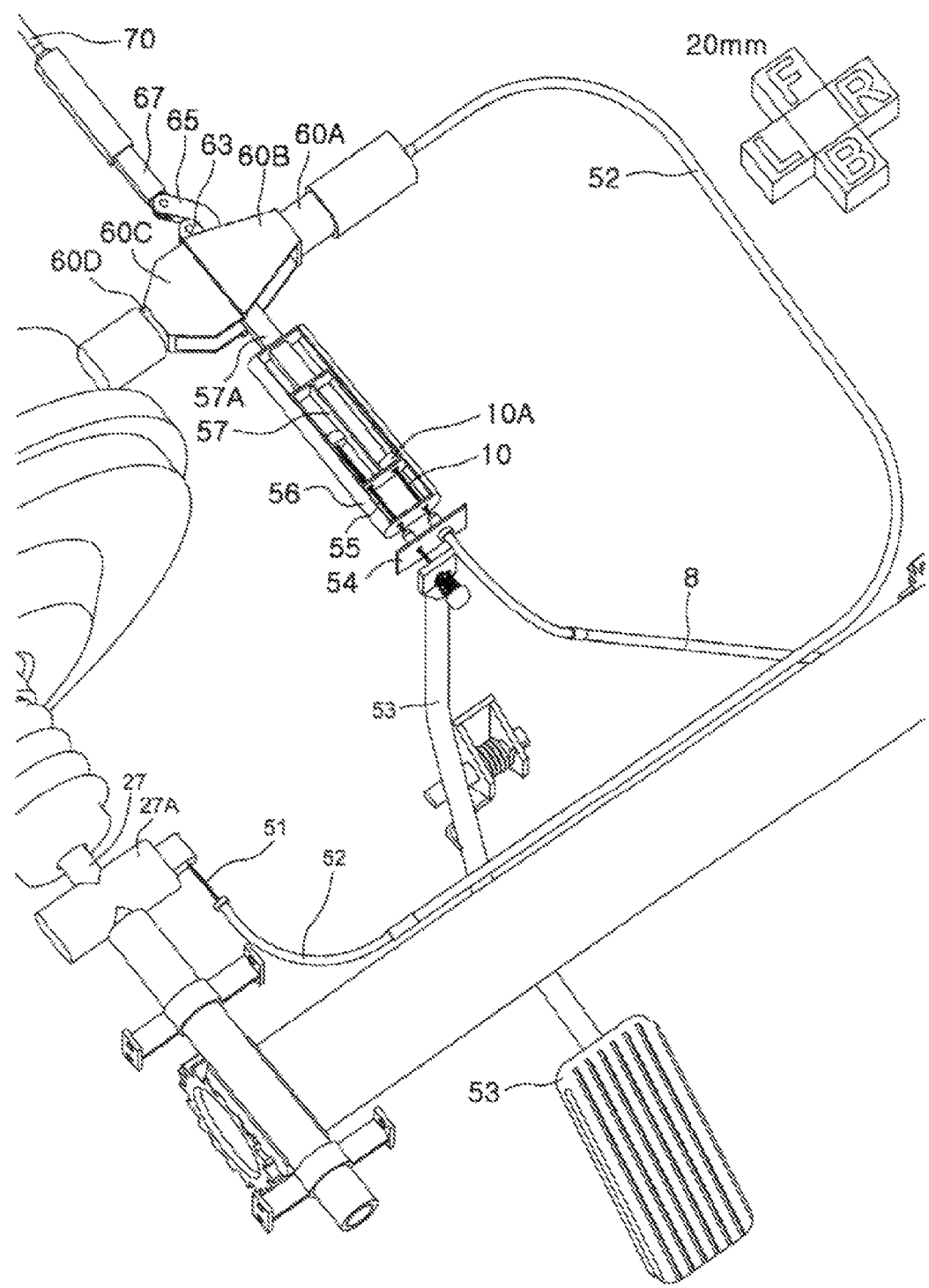
FIG. 11 is a perspective view illustrating an acceleration independent driving means according to an embodiment of the present invention.

As illustrated in FIG. 11, the acceleration independent driving means has a form in which two left and right long rings are coupled in parallel. The acceleration independent driving means includes the pair ring 57 in which a first button to which a foot acceleration cable is connected is inserted into one ring, and a second button to which a hand acceleration cable is connected is inserted into the other ring; the pair ring housing 56 which is fixed to the vehicle body, and into which the pair ring 57 is inserted to perform a linear motion forward and rearward; and a pair ring rod 57A that is integrated with the pair ring 57, and moves into the pair ring housing though a hole formed at a front surface of the pair ring housing to pull the throttle cable, thereby opening the throttle of the engine.

The pair ring 57 as illustrated in FIG. 11 is provided in order that the hand accelerator of the combo stick and the existing foot accelerator may open the throttle of the engine independently of each other. The pair ring 57 is located on the front side of a wall, that is an interface between the inside of the vehicle and an engine room, that is, in an interior of the engine room, and has the form in which the two left and right long rings are coupled in parallel, in which a foot acceleration cable 55 enters a left ring, and the hand acceleration cable 10 enters a right ring. FIG. 11 illustrates a state where a foot accelerator 53 is not stepped on, and the hand accelerator is pulled to a half degree. When the hand acceleration cable 10 is pulled rearward, a button 10A attached to a front end of the hand acceleration cable pulls rearward a tail of the pair ring 57, and the pair ring 57 performs a linear motion rearward in the acceleration pair ring housing 56 fixed to the vehicle body. At this time, the pair ring rod 57A integrated with the pair ring 57 pulls the throttle cable 70 while entering the acceleration pair ring housing 56 through the hole formed on the front surface of the acceleration pair ring housing 56, whereby the throttle of the engine is opened. On the other hand, when the hand accelerator is not pulled and the foot accelerator 53 is stepped on, the pair ring 57 is pulled by the foot acceleration cable 55, and the throttle of the engine is opened in the same manner. Since the two accelerators have no influence on a position of the counterpart and are not influenced by the position of the counterpart in the process, independence of the two accelerators is secured.

In the present invention, a cross brake override means is further installed to prevent the engine from rotating at a terrific speed when a driver steps on the brake pedal to stop the vehicle while driving the vehicle with the lever left in an acceleration position.

When a driver steps on the foot brake with his right foot to stop the vehicle while driving with the combo stick lever 3 left in an acceleration position, although the throttle is opened by the hand accelerator, a load applied to the engine reduces so that the engine rotates at a terrific speed. The cross brake override system 58 to 68 is installed to prevent this. The cross brake override system operates to return the throttle to an idle position when the foot brake is stepped on even if the combo stick is in the acceleration position. On the other hand, the cross brake override system operates in the same manner even when a driver pushes the hand brake to stop the vehicle while stepping on the foot accelerator to drive the vehicle.

The cross brake override means includes a brake override cable 51 one side of which is attached to the side branches 27A of the booster rod; a brake override cable tube 52 into which the brake override cable 51 is inserted; a brake override rake rod 60A that is connected to the opposite side of the brake override cable 51; and acceleration rods 63, 65 and 67 that are folded or unfolded according to a movement of the rake rod.

As briefly mentioned with reference to FIG. 2, when the driver steps on the foot brake to stop the vehicle while driving with the combo stick lever 3 left in the acceleration position, although the throttle is opened in an identical size due to the cruise control function of the combo stick, the load applied to the engine reduces so that the engine rotates at a terrific speed. The cross brake override system as illustrated in FIG. 11 is provided to automatically return the throttle to the idle position when the foot brake is stepped on irrespective of how much the combo stick has opened the throttle.

Figure 12:
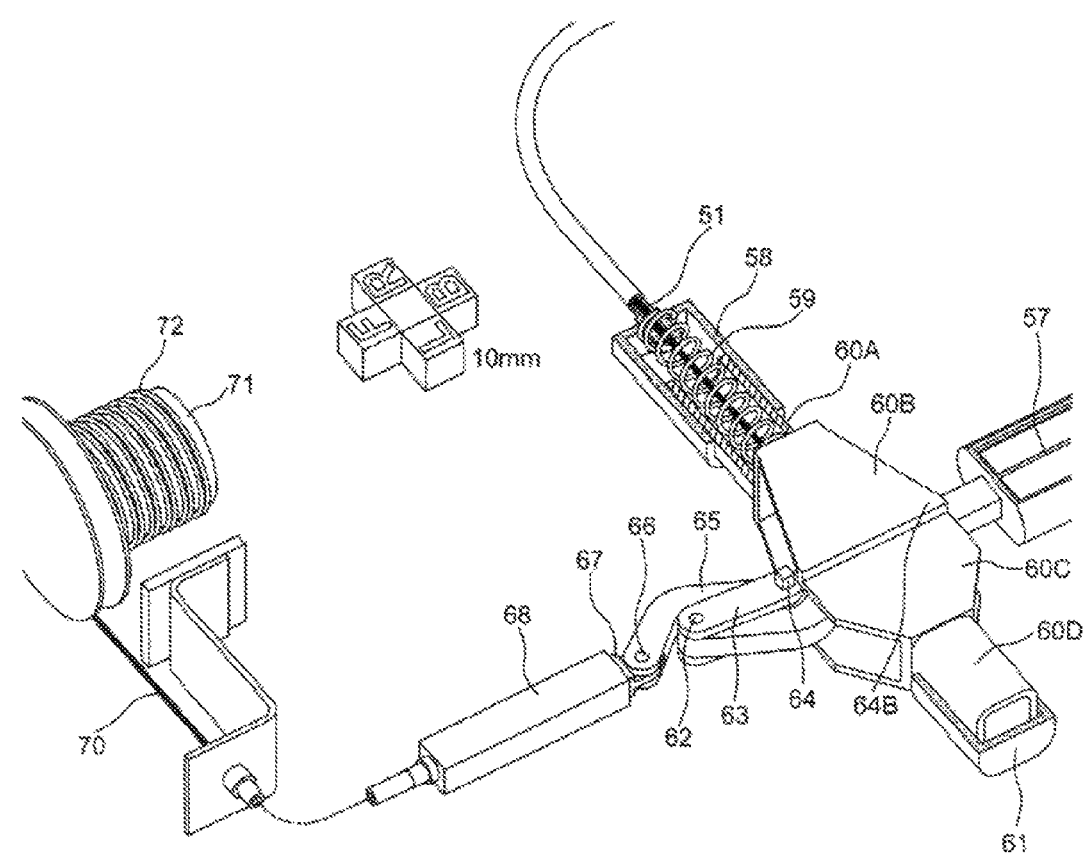
FIG. 12 is a perspective view illustrating a cross brake override system according to an embodiment of the present invention.
Figure 13A:
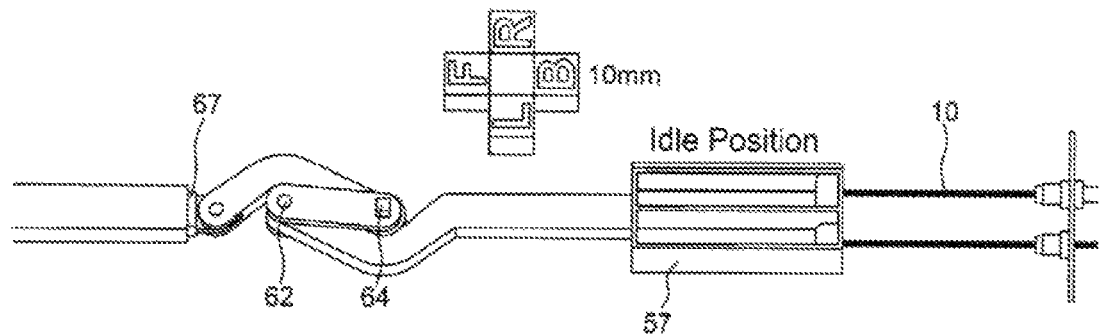
FIGS. 13A and 13E are perspective views sequentially illustrating the operation of acceleration rods according to an embodiment of the present invention.
Figure 13B:
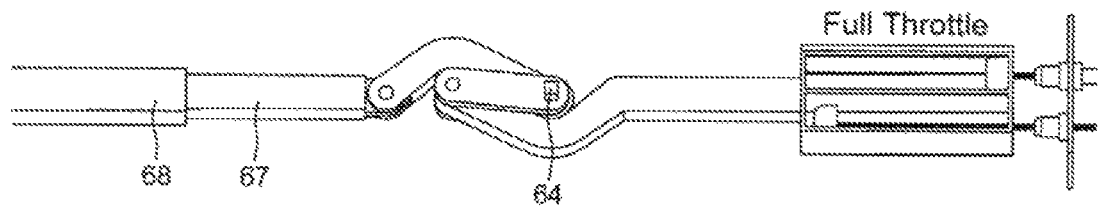
Figure 13C:
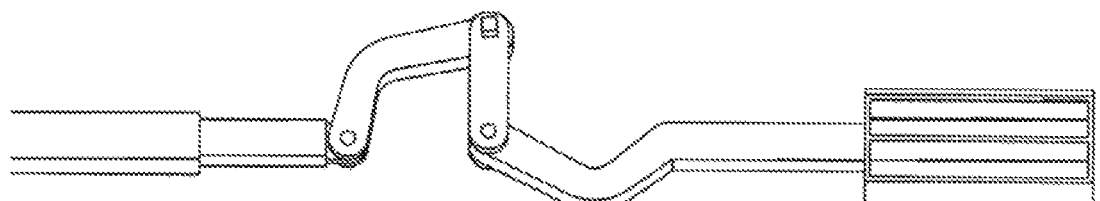
Figure 13D:
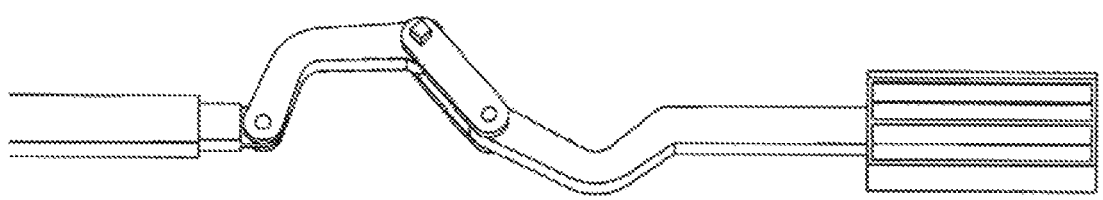
Figure 13E:
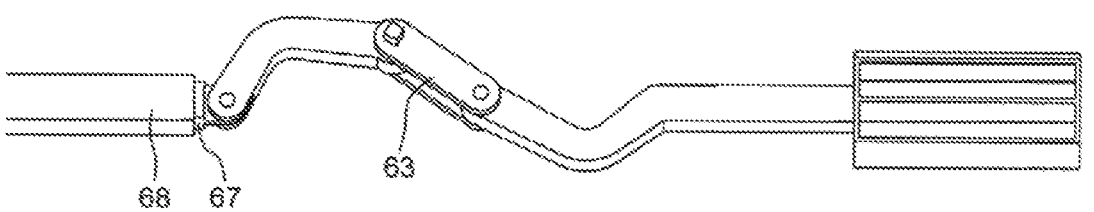
Figure 14A:
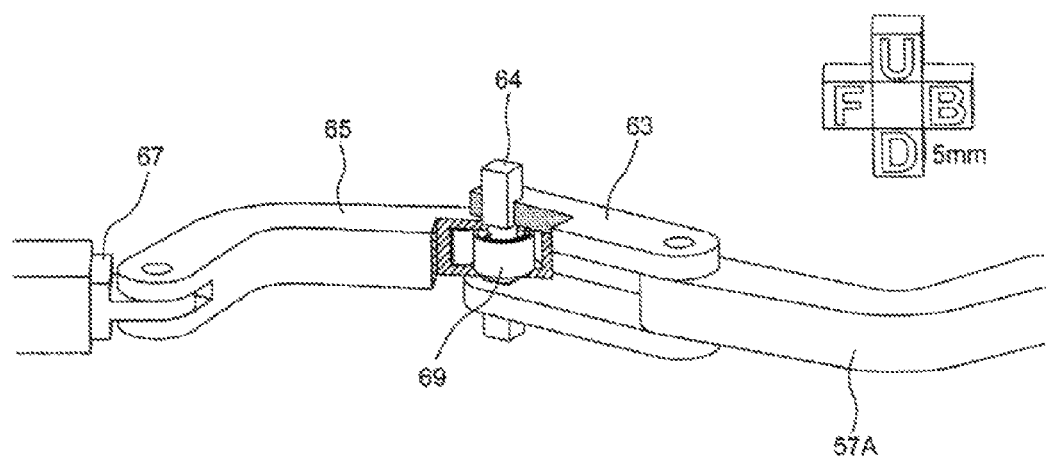
FIGS. 14A and 14B are perspective views illustrating a refolding operation of acceleration rods according to an embodiment of the present invention.
Figure 14B:
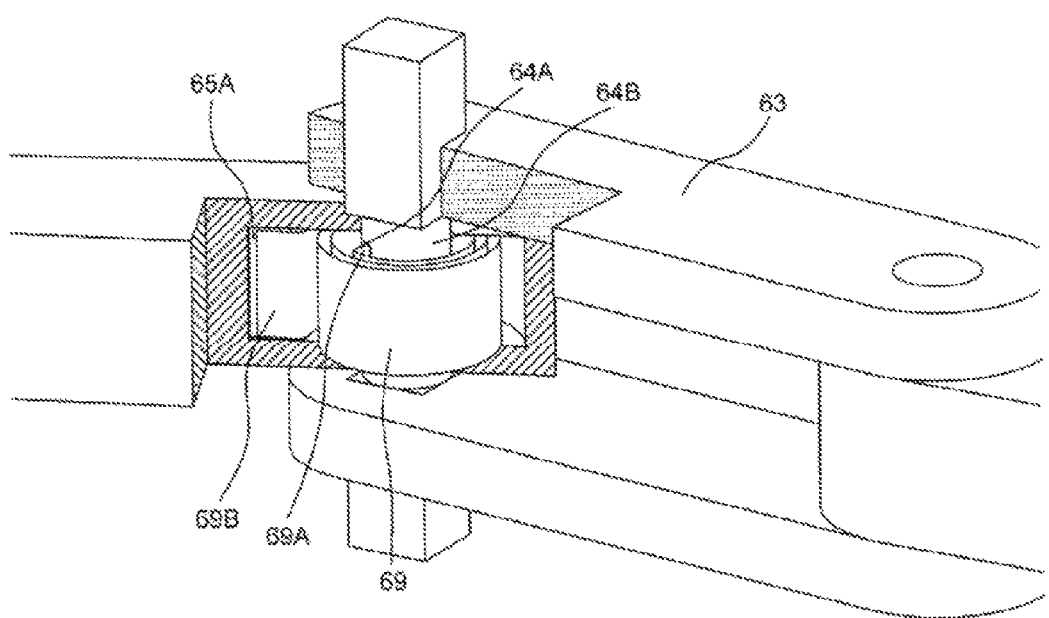

When the foot brake is stepped on, the portion forking to the left and right sides of the foot brake lever pushes forward two wings of the booster rod side branches 27A, and the brake override cable 51 attached to a right side of the booster rod side branches 27A pulls rightward the brake override rake rod 60A connected to the opposite side of the brake override cable 51 while coming out of the brake override cable tube 52. The rake rod 60A is integrated with a brake override rake 60B, a sub-rake 60C, and a rake position stabilizing rod 60D so that the whole rake structure moves rightward. At this time, since the rake 60B allows the acceleration rods 63, 65 and 67, which are formed to be folded and unfolded like a watchband, to be unfolded from a folded state, the third acceleration rod 67 returns to an idle position so that the throttle of the engine is closed, although the acceleration pair ring 57 is still in the acceleration position FIG. 12 illustrates a more specific structure of the cross brake override system. When a brake override rake structure 60 is pulled rightward (see a Front-Back-Left-Right icon) by the brake override cable 51, the rake rod 60A enters a rake rod cylinder 58, and the rake position stabilizing rod 60D opposite to the rake rod 60A comes out of a rake position stabilizing rod cylinder 61. At this time, a brake override compression spring 59 is compressed, and the rake 60 also returns to an original position by a force of the compression spring 59 when the brake booster rod returns to a neutral position.

The acceleration rods includes a first acceleration rod 63, a second acceleration rod 65, and a third acceleration rod 67 in addition to the pair ring rod 57A, and these rods are connected with each other through a first acceleration rod joint 62, a second acceleration rod joint 64, and a third acceleration rod joint 66. The uppermost and lowermost portions of a shaft of the second acceleration rod joint 64 among them protrudes further than the upper and lower surfaces of the first acceleration rod 63, and the rake 60B pulls the protruding portion.

Since the brake override rake 60B is located right behind the protrusion of the second acceleration joint 64, the brake override rake 60B does not touch the protrusion even if the brake is stepped on when the hand accelerator is in the idle position. However, when the hand accelerator moves any more closer to an accelerator position, the protrusion enters the brake override rake 60B and is pulled by the brake override rake 60B. The precision of the machine will determine how close to the protrusion of the second acceleration joint 64 the brake override rake 60B can be installed. A width of the rake in a front-rear direction covers a distance from a right rear side of the protrusion of the second acceleration joint 64 to a location of a protrusion 64B of the second acceleration joint 64 at a time of maximum acceleration, which is illustrated by a dotted line in FIG. 12. There is no problem in a case where the protrusion of the second acceleration joint 64 is in the middle of the brake override rake 60B, but the rake leans forward or rearward when the brake override rake 60B is pulled in a case where the protrusion of the second acceleration joint 64 is located at opposite ends of the brake override rake 60B, in which case the brake override sub-rake 60C and the rake position stabilizing rod 60D are installed on the left side of the brake override rake 60B in order to prevent the brake override rake 60B from being shaken.

A vertical width of the brake override sub-rake 60C is slightly narrower than that of the brake override rake 60B such that the brake override sub-rake 60C can pass by the acceleration rods, in particular, the first acceleration rod 63 having the largest vertical width to sufficiently move leftward and rightward, but the protrusion of the second acceleration joint 64 cannot pass through the brake override sub-rake 60C. Accordingly, the hand accelerator and the foot accelerator are made inoperable in a state where the brake is applied, that is, in a state where the brake override sub-rake 60c moves rightward to block the protrusion of the second acceleration joint 64.

The first acceleration rod joint 62 is located slightly to the right of the center line, and the second acceleration rod joint 64 is located slightly to the left of the center line, while a straight line joining a center of the acceleration pair ring 57 and a center of the third acceleration rod 67 serves as the center line. Accordingly, the acceleration rods move forward and rearward while being kept folded, no matter how hastily the foot brake is stepped on, or the hand brake is pulled. However, when the brake override rake 60B pulls the second acceleration rod joint 64 rightward so that the second acceleration rod joint 64 is located on the right side of the first acceleration rod joint, the acceleration rods are unfolded as a watchband is unfolded while the second acceleration rod joint 64 performs a circular motion about the first acceleration rod joint 62 by a forward pulling force from the torsion spring 72 of the throttle, and the third acceleration rod 67 enters an acceleration rod housing 68 fixed to the vehicle body to return to the idle position while the third acceleration rod joint 66 moves forward.

Since the pulling force of the torsion spring of the throttle is not applied any more in the state where the third acceleration rod 67 returns to the idle position, the pair ring rod 57A moves forward when the combo stick lever 3 is pushed to the neutral position, and the acceleration rods return to the folded state by a force of a spiral spring 69 installed in the second acceleration rod joint 64 of the second acceleration rod 65. Although the idle return can be performed since the force of the throttle torsion spring is stronger than that of the spiral spring when the third acceleration rod 67 returns to the idle state, the acceleration rods are folded again by a force by which the spiral spring 69 returns to an original state, in a situation that there is no throttle torsion spring force.

A portion at which a shaft of the second acceleration rod joint 64 contacts the first acceleration rod 63 has a rectangular section to enable the force of the spiral spring 69 to be well transferred, thus not running idle, and a portion 64B at which the shaft of the second acceleration rod joint 64 contacts the second acceleration rod 65 has a circular section to freely rotate. An inner side end 69A of the spiral spring 69 is inserted into a recess 64A formed at the shaft of the second acceleration rod joint 64, and an outer side end 69B of the spiral spring 69 is inserted into a recess 65A formed on the inner side wall of the second acceleration rod 65.

Within the cross brake override system, the rake rod cylinder 58, the rake position stabilizing rod cylinder 61, the acceleration rod housing 68, and the pair ring housing 56, which are fixed to the vehicle body, are formed through coupling two up and down steel plates having a concave-convex pattern, and movable components are inserted into center portions thereof, respectively. Accordingly, a foreign substance such as dust and the like is not introduced into the rake rod cylinder 58, the rake position stabilizing rod cylinder 61, the acceleration rod housing 68, and the pair ring housing 56 so that a mechanical malfunction can be prevented, and a superior appearance can also be achieved (not illustrated).

Such a cross brake override system as described above operates in the same manner even when a driver pushes the hand brake to stop a vehicle while stepping on the foot accelerator and driving the vehicle. That is, when the foot accelerator is stepped on, the pair ring 57 is pulled by the foot acceleration cable 55 so that the protrusion of the second acceleration rod joint 64 enters the brake override rake, and the brake override rake 60 pulls rightward the second acceleration rod joint 64 so that the acceleration rods are unfolded from a folded state in the same manner, since the brake booster rod side branches 27A move forward when the hand brake is pushed.

The combo stick vehicle of the present invention has two accelerators and two brakes, and thus mutual interference phenomenon is taken into account as illustrated in Table 1 below.

TABLE 1

| | | Secondary Operation | | | |
|---|---|---|---|---|---|
| | | Hand Accelerator | Hand Brake | Foot Accelerator | Foot Brake |
| Primary Operation | Hand Accelerator | \ | Normal Stop | OK | Cross Brake Override System operates |
| | Hand Brake | Normal Start | \ | Impossible | OK |
| | Foot Accelerator | OK | Cross Brake Override System operates | \ | Normal Stop |
| | Foot Brake | Impossible | OK | Normal Start | \ |

A total of sixteen combinations are available when a total of four apparatuses are operated twice, and the case in which an identical apparatus is operated twice is excluded since it signifies nothing. Further, there is no problem even in the case of four combinations in which a driver uses only either a hand or a foot (illustrated as "Normal Start" or "Normal Stop").

A problem may be encountered in a case where a driver performs a primary operation with a hand and then a secondary operation with a foot (the upper-right area), or performs a primary operation with a foot and then a secondary operation with a hand (the lower-left area). However, there is no problem if both the primary and secondary operations are for an accelerator or a brake (illustrated as "OK"). Meanwhile, when the hand accelerator and the foot accelerator are used together, a driving speed of the vehicle is determined by one of the two, which further pulls the pair ring.

Four combinations are finally left, in which problems are solved since the cross brake override system operates in a case where a driver steps on the foot brake with the hand accelerator left in an acceleration position, and in a case where a driver pushes the hand brake with his foot left on the foot accelerator while stepping on the foot accelerator and driving the vehicle. The sub-rake of the cross brake override system serves to allow the accelerator not to operate in a state where any one of the foot brake and the hand brake is applied.

A driver has only to step on the foot accelerator but not the foot brake, or pull the hand accelerator of the combo stick, when the user desires to speed up the engine in order to promptly preheat the engine while a vehicle stops. In this case, an automatic transmission should be in a parking (P) position.

Not all the combo stick vehicles are necessarily driven only with a hand. A right foot may be substituted for a right hand when the right hand gets tired or has to do something different, since there is no reason to believe that the hand does not get tired during a long period of driving, even if the hand gets less tired than the foot. A driver may freely select one of driving a vehicle with his hand and driving the vehicle with his foot according to a situation or his preference.

It can be seen that the embodiment having been illustrated for descriptions of the present invention is simply one embodiment in which the present invention is embodied, and a variety of combinations can be made in order to realize subject matters of the present invention as illustrated in the drawings.

Accordingly, it will be understood that the present invention is not limited to the embodiment, and various modifications and variations can be made by those skilled in the art to which the present invention pertains without departing from the spirit and scope of the present invention described in the below claims.

The invention claimed is:

1. A vehicle driving apparatus comprising:
    a lever that moves to an acceleration position, an idle position, or a brake position as rotating about a shaft fixed to a vehicle body at a predetermined angle;
    a hand acceleration means that opens an engine throttle independently of an acceleration pedal operated by a foot to cause a vehicle to be accelerated, when the lever moves to the acceleration position; and
    a hand brake means that pushes a booster rod of a brake booster independently of a brake pedal operated by the foot to cause the vehicle to be stopped, when the lever moves to the brake position,
    wherein the hand brake means comprises:
    a brake push rod that is attached to a front side of the lever;
    a fan-shaped saw tooth rod that is installed on the front side of the brake push rod, has a fan-shaped saw tooth formed at an upper end thereof, and rotates about a shaft fixed to the vehicle body;
    a transverse bar saw tooth that is engaged to rotate together with the fan-shaped saw tooth;
    a linear saw tooth that is engaged with an upper surface of the transverse bar saw tooth; and
    a hand brake pipe that is integrated with the linear saw tooth, and presses the booster rod of the brake booster.

2. The vehicle driving apparatus as claimed in claim 1, wherein the lever moves to the acceleration position when being pulled rearward from the idle position, and moves to the brake position when being pushed forward from the idle position.

3. The vehicle driving apparatus as claimed in claim 1,
    wherein the hand acceleration means comprises:
    a hand acceleration cable that is connected with a throttle cable for the sake of opening the engine throttle;
    a hand acceleration ring that is connected to a rear end of the hand acceleration cable;
    a throttle pulling part that is inserted into the hand acceleration ring to pull the hand acceleration ring, and is attached to the lever; and
    a hand acceleration ring housing that serves as a guide when the hand acceleration ring carries out a circumferential motion about a rotary shaft of the lever while being pulled by the throttle pulling part, and is installed to be fixed to the vehicle body.

4. The vehicle driving apparatus as claimed in claim 1, further comprising:
    a hand brake locking means that allows the brake to be continuously applied even if a driver takes his hand off the lever; and
    a guide means that is installed on the left and right sides of the lever to prevent the lever from being shaken leftward and rightward.

5. The vehicle driving apparatus as claimed in claim 4,
    wherein the hand brake locking means comprises:
    a button that is installed in a handle of the lever, and repeatedly enters the handle when being pushed once and exits from the handle when being pushed once again;
    a circular outer cylinder that is integrated with the handle, and is installed in an interior of the handle;
    a button core that is installed in an interior of the outer cylinder, and continuously rotates in one direction whenever entering and exiting from the handle while moving together with the button;
    a button hexagonal column that is inserted into a hexagonal cylinder integrated with the outer cylinder not to be rotated, one end of which is inserted into the button core to move together with the button core, and which is connected to a brake locking cable;
    brake locking tongs in which an interval between tails thereof becomes narrower and an interval between front ends thereof becomes wider by pulling of the brake locking cable, and steel saw teeth are integrally formed with the front ends; and
    left and right saw tooth plates that are installed to be fixed to the vehicle body, and couples with the steel saw teeth when an interval between the steel saw teeth becomes wider.

6. The vehicle driving apparatus as claimed in claim 4,
    wherein the guide means comprises:
    guide plates that are installed on the left and right sides of the lever;
    a bearing housing that is attached to the lever, wherein windows are respectively formed on the left and right sides thereof;
    bearing plates that protrude through the left and right windows of the bearing housing to contact the guide, plates, and minimize abrasion caused by friction;
    circular columns that are formed on inner sides of the left and right bearing plates, respectively; and
    a compression spring that is fitted with the circular columns.

7. The vehicle driving apparatus as claimed in claim 6, wherein an interval between the left and right guide plates is identical with a width between the left and right bearings when the lever is in the brake position, is slightly larger than a width between the left and right bearings when the lever is in the idle position, and is slightly smaller than a width between the left and right bearings when the lever is in the acceleration position, and a friction force is caused between the guide plates and the bearing surfaces by a force of the compression spring when the lever is in the acceleration position.

8. The vehicle driving apparatus as claimed in claim 7, wherein a magnitude of the friction force is larger than a force by which a torsion spring of the engine throttle pulls the lever in the acceleration position to the idle position so that the lever stays in the acceleration position even if the driver takes his hand off the lever, and a cruise control function is realized.

9. The vehicle driving apparatus as claimed in claim 7, further comprising: a guide plate interval adjusting means that adjusts the magnitude of the friction force.

10. The vehicle driving apparatus as claimed in claim 9, wherein the guide plate interval adjusting means comprises:
a moving guide plate that is installed to be adjacent to one side of the lever;
a fixed wall that is fixed to the vehicle body to position the moving guide plate;
a moving guide plate cylinder that is formed such that one end thereof is adjacent to the moving guide plate;
a fixed wall cylinder into which the moving guide plate cylinder is inserted, and which is formed such that one end thereof is adjacent to the fixed wall;
a tension spring that is installed inside both the moving guide plate cylinder and the fixed wall cylinder;
a wedge wall that is fixed to the moving guide plate, and is installed adjacent to the conical wedge; and
a wedge rod that extends vertically from the wedge, wherein an external thread is formed at a lower end thereof to be coupled with an internal thread at a lower portion of the fixed wall, and a screw handle is coupled with an upper end thereof, and
wherein the screw handle is exposed to the inside of the vehicle, and is installed to be arbitrarily adjusted by the driver.

11. A vehicle driving apparatus comprising:
a lever that moves to an acceleration position, an idle position, or a brake position as rotating about a shaft fixed to a vehicle body at a predetermined angle;
a hand acceleration means that opens an engine throttle independently of an acceleration pedal operated by a foot to cause a vehicle to be accelerated, when the lever moves to the acceleration position;
a hand brake means that pushes a booster rod of a brake booster independently of a brake pedal operated by the foot to cause the vehicle to be stopped, when the lever moves to the brake position;
a brake pedal that is stepped on and manipulated by the foot of a driver;
the acceleration pedal which is stepped on and manipulated by the foot of the driver;
a brake independent driving means that enables the brake pedal and the lever to press the booster rod of the brake booster independently of each other; and
an acceleration independent driving means that is installed such that the acceleration pedal and the lever independently open a throttle of the engine,
wherein the acceleration independent driving means comprises:

a pair ring that has a form in which two left and right long rings are coupled in parallel, wherein a first button to which a foot acceleration cable is connected is inserted into one ring, and a second button to which a hand acceleration cable is connected is inserted into the other ring;
a pair ring housing into which the pair ring carrying out a linear motion forward and rearward is inserted, and which is installed to be fixed to the vehicle body; and
a pair ring rod that is integrated with the pair ring, moves into the pair ring housing though a hole formed on a front surface of the pair ring housing to pull a throttle cable, and opens the throttle of the engine.

12. The vehicle driving apparatus as claimed in, claim 11, wherein the brake independent driving means comprises:
a foot brake lever that is connected to the brake pedal, has an insertion hole which is formed at the upper end thereof and into which a hand brake pipe is inserted, and does not contact the hand brake pipe; and
a booster rod side branch that is integrally coupled to the booster rod, is pressed by the foot brake lever according to an operation of the brake pedal, and is pressed by the hand brake pipe when the hand brake pipe moves forward by the hand brake means.

13. The vehicle driving apparatus as claimed in claim 11, further comprising: a cross brake override means that returns the throttle of the engine, which has been still opened by the hand acceleration means, to the idle position irrespective of a position of the lever, when the driver steps on the brake pedal to stop the vehicle while driving the vehicle with the lever left in the acceleration position.

14. A vehicle driving apparatus comprising:
a lever that moves to an acceleration position, an idle position, or a brake position as rotating about a shaft fixed to a vehicle body at a predetermined angle;
a hand acceleration means that opens an engine throttle independently of an acceleration pedal operated by a foot to cause a vehicle to be accelerated, when the lever moves to the acceleration position;
a hand brake means that pushes a booster rod of a brake booster independently of a brake pedal operated by the foot to cause the vehicle to be stopped, when the lever moves to the brake position,
a brake pedal that is stepped on and manipulated by the foot of a driver;
the acceleration pedal which is stepped on and manipulated by the foot of the driver;
a brake independent driving means that enables the brake pedal and the lever to press the booster rod of the brake booster independently of each other; and
an acceleration independent driving means that is installed such that the acceleration pedal and the lever independently open a throttle of the engine; and
a cross brake override means that returns the throttle of the engine, which has been still opened by the hand acceleration means, to the idle position irrespective of a position of the lever, when the driver steps on the brake pedal to stop the vehicle while driving the vehicle with the lever left in the acceleration position,
wherein the cross brake override means comprises:
a brake override cable that is attached to aside branch of the booster rod;
a brake override rake that is connected to the opposite side of the brake override cable, and enables idle return to be performed irrespective of how much the engine throttle is opened by the hand acceleration means;

a brake override rake rod that is integrated with the brake override rake;

a brake override rake rod cylinder that serves as a guide when the brake override rake rod moves leftward and rightward, and is installed to be fixed to the vehicle body;

a brake override compression spring that is interposed between the brake override rake rod and the brake override rake rod cylinder, and pushes the brake override rake such that the brake override rake also returns to an original position, when the side branch of the booster rod returns to an original position;

a sub-rake that is integrated with the brake override rake, and a vertical width of which is slightly narrower than that of the brake override rake;

a rake position stabilizing rod that is integrated with the sub-rake;

a rake position stabilizing rod cylinder that serves as a guide when the rake position stabilizing rod moves leftward and rightward, and is installed to be fixed to the vehicle body; and acceleration rods that are folded or unfolded according to a movement of the brake override rake.

* * * * *